United States Patent [19]
Suzuki et al.

[11] Patent Number: 5,172,006
[45] Date of Patent: Dec. 15, 1992

[54] ELECTRIC BRAKING AND AUXILIARY ENGINE MECHANISM FOR A MOTOR VEHICLE

[75] Inventors: Takayuki Suzuki, Tokorozawa; Tetsuo Koike, Hachiohji; Atsuomi Obata, Hachiohji; Masashi Shigemori, Hachiohji; Kohji Sasaki; Sadayoshi Iketani, both of Yokohama; Hiroshi Uchino, Hachiohji; Kouzou Kawata, Hino, all of Japan

[73] Assignees: Hino Jidosha Kogyo Kabushiki Kaisha, Tokyo; Kabushiki Kaisha Toshiba, Kawasaki, both of

[21] Appl. No.: 732,229

[22] Filed: Jul. 18, 1991

Related U.S. Application Data

[63] Continuation of Ser. No. 415,277, Aug. 18, 1989, Pat. No. 5,053,632.

[30] Foreign Application Priority Data

| Feb. 18, 1987 | [JP] | Japan | 62-36278 |
| Feb. 18, 1987 | [JP] | Japan | 62-36279 |
| Feb. 18, 1987 | [JP] | Japan | 62-36281 |
| Feb. 18, 1987 | [JP] | Japan | 62-36380 |
| Feb. 16, 1988 | [JP] | Japan | 63-33605 |
| Feb. 17, 1988 | [JP] | Japan | 63-32926 |

[51] Int. Cl.$^5$ .................. B60L 7/20; B60L 11/00; B60K 6/02
[52] U.S. Cl. .................. 290/45; 180/65.2; 290/50
[58] Field of Search .............. 180/65.2; 290/45, 50

[56] References Cited

U.S. PATENT DOCUMENTS

| 4,305,254 | 12/1981 | Kawakatsu et al. | 290/45 |
| 4,313,080 | 1/1982 | Park | 290/50 |
| 4,562,895 | 1/1986 | Yang | 180/65.2 |
| 5,053,632 | 10/1991 | Suzuki et al. | 290/45 |

FOREIGN PATENT DOCUMENTS 46-23984 7/1971 Japan .
58-183004 12/1983 Japan .

Primary Examiner—A. D. Pellinen
Assistant Examiner—Robert Lloyd Hoover
Attorney, Agent, or Firm—Cushman, Darby & Cushman

[57] ABSTRACT

This invention relates to an electric braking and auxiliary engine mechanism for a motor vehicle including a rotary machine coupled with the crank shaft of the internal combustion engine which drives the axle of the vehicle. This mechanism is characterized in that squirrel-cage polyphase induction machine is used as the rotary machine which is fixedly connected to the crank shaft, and the squirrel-cage polyphase induction mechanism is fed with a revolving magnetic field which is variable either positive or negative direction by an invertor, so that the squirrel-cage polyphase induction machine may be utilized either as a power generator or a motor.

31 Claims, 17 Drawing Sheets

ELECTRIC BRAKING AND AUXILIARY ENGINE MECHANISM FOR A MOTOR VEHICLE

This is a continuation of application Ser. No. 07/415,277, filed Aug. 18, 1989, now U.S. Pat. No. 5,053,632 published Oct. 1, 1991.

TECHNICAL BACKGROUND

This invention relates to an electric braking and auxiliary engine mechanism which performs braking and auxiliary acceleration for motor vehicles and more particularly, to an electric braking and auxiliary engine mechanism which includes a rotary machine directly coupled to the crank shaft of an internal combustion engine which drives the axle of the vehicle.

PRIOR ART

The progress of internal combustion engines, especially improvements in supercharging technology, along with development of thermally resistant materials, have successfully realized an internal combustion engine of small stroke volume with high output power. As the capacity of an internal combustion engine becomes smaller, however, the effect of an exhaust retarder or an engine brake is reduced in correspondence with to its stroke volume, necessitating the concurrent use of a retarder. More specifically, an auxiliary brake system is required in addition to the friction brake equipment mounted on wheels, to offset acceleration caused when motor vehicles go downhill, or to reduce the speed to a predetermined level in the initial stage of braking at high speed. There has been provided a retarder, of an eddy current system type of a power generator with an inductor-type structure, directly coupled with the rotor shaft of the internal combustion engine. Although the retarder of an eddy current system is sturdy enough to withstand the outside force caused by the irregular vibration of wheels due to rough roads, the system cannot regenerate useful energy as it converts all of the mechanical energy to be consumed for braking into thermal energy and dissipates it into the atmosphere. This goes against the recent trend of improving fuel consumption, and a device with a large thermal capacity mounted on a motor vehicle for thermal radiation inconveniently increases the size of the system.

It has been proved that the direct coupling of an inductor-type alternator with the crank shaft of an internal combustion engine is effective as an auxiliary retarder. It has also been proved that in this system, mechanical energy consumed for braking can be converted into electric energy, and that electric energy is recovered in a rechargeable battery which may be used for a starter or other facilities mounted on the vehicle. A generator of this type is, however, defective in that the gap between the stator and the rotor of the generator must be as small as possible, in order to prevent magnetic leakage which reduces efficiency, and that the manufacturing precision of the rotor and the stator must be improved to an extensive degree. This will require considerable working expense in mass production.

The machine would be able to provide extra operational modes for drivers to improve driving performance, when the driving means for start/acceleration and climbing/running support are used in addition to the main driving means.

Inventors have conducted experiments using a squirrel-cage polyphase induction machine as above, and have found that a large braking force is obtained, that electric energy, generated by braking, can be recovered to a large extent in a rechargeable battery, and that the rechargeable battery can be used effectively as the electric power source for auxiliary power.

Inventors have carried out various experiments in order to grasp the relation between the revolving speed of the rotor and the braking torque given to the crank shaft. They have noticed a phenomenon in which no braking torque is generated when the revolving speed of the rotor is at a certain high value, and when low resistance value of a shunt resistor is connected to the electric output of the machine in order to attain large breaking torque. They have carried out their experiments by varying the resistance value of the resistor and the revolving speed, in order to find out the reason. They have learned that braking torque is reduced rapidly when the output is terminated by a resistor of small value, and when the revolving speed of the shaft is low, and that as the resistance value increases, the range for generating normal braking torque expands with the higher revolving speed of the shaft. However, large braking torque cannot be attained with a high value of resistance because its dissipated energy is low.

Inventors have considered the following: The squirrel-cage polyphase induction machine and the invertor may be regarded as one integral DC power source. The power generated by the DC power source is proportional to the revolving speed of the squirrel-cage polyphase induction machine, and the output voltage of the DC power source is also proportional to the revolving speed. The power dissipated by the resistor, which is the load of the power source, however, is proportional to square of the output terminal voltage. Accordingly, when revolving speed increases and when the output voltage increases, dissipated power is exceeding generated power. This means that the squirrel-cage polyphase induction machine of this state is not working as a power generator, and that the machine rapidly loses braking torque.

Inventors have also observed that when a large electric current is continuously supplied to the resistor in order to generate a large braking torque continuously, the braking torque becomes lower with the passage of time. This is because the resistor is heated by the current and because value of the resistor increases with the temperature. This means the dissipated electric energy becomes smaller. In order to avoid this phenomenon, a resistor with a small resistance value might be selected, but it should be avoided, because the small resistance value would make the current increases and the stator winding of the machine would be heated when a large braking torque is generated.

It is known, on the other hand, that a technology has been disclosed by Volkswagen AG of West Germany in OS No. 2943554 (Patent Disclosure of West Germany) and the U.S. Pat. No. 4,533,011, wherein a squirrel-cage polyphase induction machine is used as a retarder, and the revolving speed of the magnetic field fed to the stator of the induction machine is controlled to operate the machine as a generator for the brake, or as a motor of the auxiliary driving device.

In the Patent Disclosure above, it is disclosed that a squirrel-cage polyphase induction machine is connected to the crank shaft, and that a revolving magnetic field with positive slip is given to the induction machine so as to use it as an auxiliary motor device. It is also disclosed that a revolving magnetic field with a negative slip to the squirrel-cage polyphase induction machine will allow the machine to be driven by the internal combustion engine as a power generator to charge the battery, the power of which can be used for the auxiliary motor. It must be noticed, however, that a second clutch is provided in the disclosed device, for coupling the rotor shaft of the squirrel-cage induction machine to the axle of the motor vehicle, and for separating it from the crank shaft of the internal combustion engine. When the second clutch is opened, the motor vehicle may be driven as an electric vehicle with the auxiliary power alone to achieve a noiseless engine without air-polluting exhaust gas. It is not mentioned, however, that the machine may be used as a retarder to help the engine brakes. Moreover, they do not mention anything about the use of a resistor with a low value for energy dissipation.

OBJECT OF THE INVENTION

The primary object of this invention is to provide an auxiliary engine system for motor vehicles which is mechanically durable, generates less noise, achieves stronger braking, and is suitable for mass-production.

The second object of this invention is to provide an auxiliary engine system for motor vehicles which is provided with an invertor means with a sufficient frequency range to output frequencies corresponding to variations in the revolving speed of the magnetic field of the squirrel-cage polyphase induction machine, so that it may be operated as an auxiliary driving means, at a lower cost, without occupying additional space on the motor vehicle.

The third object of this invention is to provide an auxiliary engine system for motor vehicles which can maintain high braking torque by dissipating the electric energy continuously at the resistor.

The fourth object of the invention is to provide an auxiliary engine system for motor vehicles which can effectively recycle electric energy generated by breaking to a rechargeable battery, which may be used as an auxiliary power source.

The fifth object of the invention is to provide an auxiliary engine system for motor vehicles which can effectively generate a large braking torque for a long period of time over a wide range of revolving speeds of the crank shaft of an internal combustion engine.

DISCLOSURE OF THE INVENTION

The present invention relates to an auxiliary engine system for motor vehicles including a rotary electric machine coupled to the crank shaft of the internal combustion engine which drives the axle of the vehicle, which is characterized in that said crank shaft and a rotary shaft of the rotary electric machine are fixedly connected. The rotary electric machine is a squirrel-cage polyphase induction machine, and the system is provided with an electric means for giving revolving magnetic field to the squirrel-cage polyphase induction machine.

This system is preferable in its structure, as the a rotor of said squirrel-cage polyphase induction machine is mounted on a fly-wheel engaged with the crank shaft of an internal combustion engine, while a stator thereof is mounted on inside of the fly-wheel housing.

It becomes possible to perform braking suitable to the running conditions of motor vehicles by directly coupling the rotor of the squirrel-cage polyphase induction machine with the crankshaft of the combustion engine as mentioned above, and to control electrically the revolving speed of magnetic field at the stator of the squirrel-cage polyphase induction machine. More specifically, the squirrel-cage polyphase induction machine may be operated as a power generator by making the revolving speed of the magnetic field lower than the mechanical revolving speed of the rotor, thereby giving a braking torque to the motor vehicle. The squirrel-cage polyphase induction machine may be used as a driving motor by making the revolving speed of the magnetic field higher than the mechanical revolving speed of the rotor so as to give auxiliary driving force to the crank shaft of the internal combustion engine.

As it is impossible to predict the driving conditions for the motor vehicle which require braking, the necessity arises always unexpectedly. It is, therefore, necessary for a rechargeable battery to be charged initially with less than the rated chargeable capacity, and the battery is available to be recharged with electric energy, with high efficiency, when such electric energy is generated for electric braking. The charged energy can be used as an auxiliary driving force to save fuel consumption by the internal combustion engine by that amount.

The invertor means according to this invention is connected between the phase terminals of the squirrel-cage polyphase induction machine and the two terminals of the DC power source, and is provided with switching elements each of which includes a parallel circuit of transistors and diodes.

It also comprises a rotary sensor which detects the revolving speed of the squirrel-cage polyphase induction machine as an electric signal, a control means which generates control reference during the time the vehicle is being driven, an adder which issues control signals to feed the sum to said switching elements by adding the control reference to the revolutional speed data, a serial circuit with a switching circuit, and a resistor with a small resistance connected to both terminals of said DC power source.

The control means to give the reference for control includes: one switch which is manipulated by the driver of the car to instruct auxiliary acceleration, another switch which is manipulated by the driver to instruct auxiliary braking, and a programed control circuit which generates the control reference to give a different slip in positive or negative values to the squirrel-cage polyphase induction machine, with the manipulation of said two switches. It is preferable that the control means to give the reference include a circuit which inputs the manipulation information of the starter key switch, of the internal combustion engine, and also that the programed control circuit include a means to generate the reference so as to induce a revolving magnetic field, suitable to start the internal combustion engine, the squirrel-cage polyphase induction machine base on the above information.

The DC power source may include a rechargeable battery whose rated terminal voltage is lower than the rated terminal voltage of the DC power source, with a step-up chopper and a step-down chopper of a reactor type connected to the rechargeable battery. The switching circuit may include a circuit which automatically closes when the terminal voltage of the DC power source reaches a predetermined voltage higher than the rated terminal voltage thereof.

The mechanism of this invention thus constructed may be used as a braking system, when the revolving speed of the revolving magnetic field is controlled to give a negative slip in respect to the revolving speed of the rotor operating it as a power generator, and may be used as an auxiliary motor, when it is controlled to give a positive slip in respect to the revolving speed of the rotor.

As switching elements of a complex type, which include a parallel circuit of transistors and diodes, are installed in the invertor circuit, DC electric current can be taken out through said elements when the mechanism is used as a generator, and the electric current for the revolving magnetic field can be supplied from the DC power source, through said elements, when it is used as a motor. The revolving speed information of the squirrel-cage polyphase induction machine is detected in the form of electric signals, with which negative feedback servo control is performed in order to give the desired revolving magnetic field to the induction machine via the control of the invertor circuit. This enables control with higher stability and higher precision. The control reference for said negative feedback servo control is generated in accordance with the driving operation so as to match the conventional driving operation of the motor vehicle.

When the squirrel-cage polyphase induction machine is used as a generator, the energy generated may be recycled for the DC power source. However, it is impossible to recover all of the electric energy generated from braking as the braking operation is needed at any time, depending on the driving conditions, and the braking torque generally fluctuates in a wide range. A dissipating resistor is therefore provided to deal with the situation where the breaking energy is too excessive to be recovered. The resistor is connected to the electric output of the machine with a switching circuit so as to dissipate the excessive electric energy, which is dissipated as thermal energy when providing large braking torque in a short period.

The dissipating resistor is adapted to automatically connected to the electric output when the terminal voltage of the DC power source reaches a predetermined voltage (e.g. 120%) which is larger than the rated terminal voltage thereof, so that control of the dissipation of braking energy of the resistor is independent of said negative feedback servo control.

When two switches mentioned above are provided for manipulation by the driver, proper driving operation may be performed by feeding different slips in positive and negative directions to the squirrel-cage polyphase induction machine, in accordance with the driver's manipulation.

This mechanism may be provided with a circuit which receives input information from the start key switch of the internal combustion engine, and with a program circuit which generates the control reference for giving a revolving magnetic field, of an extremely low speed, suitable to the start of the internal combustion engine, to the squirrel-cage polyphase induction machine corresponding to said input information from the start key switch. The squirrel-cage polyphase induction machine can be used also as a motor to start the internal combustion engine.

The squirrel-cage polyphase induction machine and the invertor circuit may have higher output voltages to reduce output polyphase current, but the DC current conventionally mounted on motor vehicles is of a considerably low voltage. In order to match such low voltage current with the output voltage of the invertor circuit, it is preferable to provide a step-up chopper and a step-down chopper, of a reactor type, which converts the relatively low voltage of the rechargeable battery to and from the terminal voltage, on the DC side of the invertor.

The mechanism of this invention is characterized by a detector, which detects electric signals corresponding to revolving speed of the crank shaft, and a controller which controls the substantial resistance value of the resistor to be a larger value, as the speed detected by the detector increases.

The controller preferably includes a semiconductor switching circuit serially connected to the resistor, and a switching controller which gives periodical control signals to the semiconductor switching circuit. The switching controller preferably includes a circuit which can change the duty ratio of control signals in accordance with output of the detector, while the detector preferably includes a circuit which detects changes in the electric current passing through the resistor as electric signals corresponding to temperature of the resistor. The controller preferably is structured in a manner that only when detection output from the detector exceeds a predetermined level, the equivalent value of the resistor is controlled to increase to a larger value.

The mechanism according to this invention preferably includes a temperature detector which detects electric signals corresponding to the temperature of the resistor mentioned above, and a controller which controls the substantial value of the resistor to be at a smaller level, when the temperature of the resistor increases in accordance with the output from the detector.

It is preferable that the controller include a semiconductor switching circuit connected serially to the resistor, and a switching controller which gives periodic ON-OFF control signals to the semiconductor switching circuit. The switching controller includes a circuit which can vary the duty ratio of the signals in accordance to the output from said temperature detector. The temperature detector includes a circuit which detects the changes in electric current passing through the resistor in the form of electric signals corresponding to the temperature of the resistor, and the controller includes a means which can control substantial values of the resistor corresponding to the output from the detector.

It is further preferable that this mechanism include a detector which detects electric signals in correspondence to the temperature of the resistor, and a controller which controls the revolving magnetic field in correspondence to the output from the detector, so as to increase voltage generated from the squirrel-cage polyphase induction machine. The controller may includes a means which can control the pulse width of the electric current to be fed to the squirrel-cage polyphase induction machine.

Substantial value of the resistor should be varied in accordance with the revolving speed of the crank shaft of the internal combustion engine, in order to carry out electric braking at a high efficiency for a long time over a wide range of revolving speeds. When the revolving speed is low, resistance should be small, and as the revolving speed increases, resistance should be larger. This can be realized by changing the connecting taps of the resistor. However, the device for switching the taps of the resistor requires a number of switching circuits and resistor elements, with high thermal and current capacity. This would inconveniently increase the size and weight of the device mounted on the motor vehicle. It is therefore preferable to use a circuit comprising a resistor of low value and a semiconductor switching circuit, connected serially, so that substantial resistance value can be varied by periodically turning the semiconductor switching circuit ON and OFF to change the duty ratio thereof.

It is also preferable to use the output from the rotary sensor as the electric signals corresponding to the revolving speed of the crank shaft. In accordance with the output, ON-OFF control signals of varying duty ratio are fed to the semiconductor switching circuit so that as the output increases, substantial value of the resistor may be controlled to be set at larger value. In this manner, matching the power generator and the load may be improved in the range where revolving speed is high and generated voltage is high. It increases braking torque and accordingly the system can be applied to an electric braking system over a wide range.

The power dissipated P by the resistor is expressed as $$P = V^2/R$$

when the resistance of the resistor is R and the DC voltage of the resistor is V. When electric power is continuously dissipated for a long time on the resistor, temperature of the resistor increases and the resistance R also increases. If the resistance R is controlled to be at a smaller level in effective value, a large dissipated power can be maintained for a long time.

More particularly, the output voltage of the invertor and the electric current of the resistor are monitored, so that when the current passing through the resistor increases in proportion to voltage of the invertor, the substantial resistance value of the resistor is controlled to be increased. When electric current decreases, due to heat generated by the resistor itself, even if the voltage remains at the same level, the substantial resistance value of the resistor is controlled at lower level.

The rise in temperature of the resistor is most simply detected by watching if electric current passing through the resistor becomes smaller so as to learn the decrease in electric current corresponding to the increase in temperature.

Figure 1:
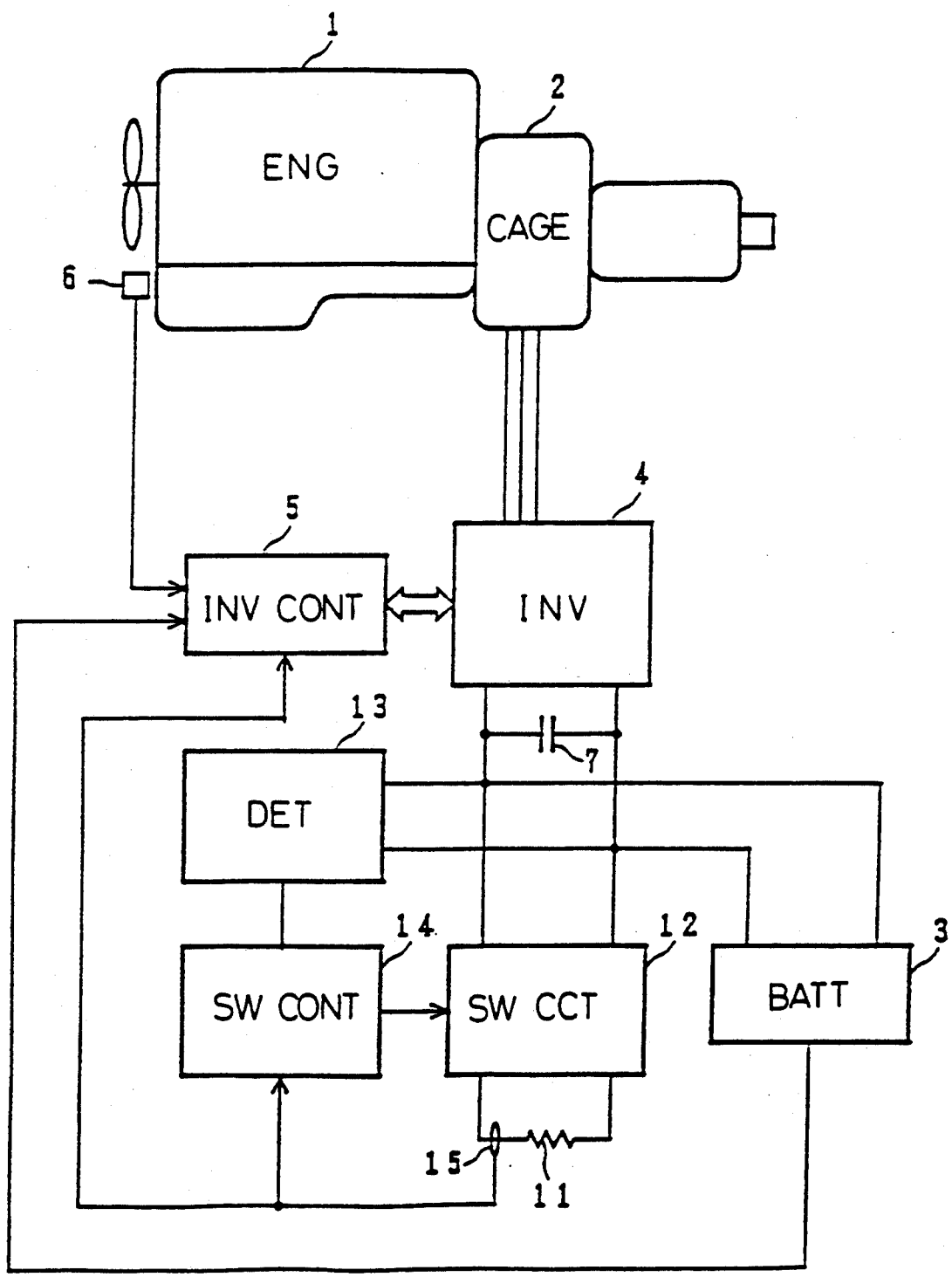
FIG. 1 is a block diagram of the structure of an embodiment according to this invention.

In the figures the reference numeral 1 denotes the internal combustion engine, 2: the squirrel-cage polyphase induction machine, 3: the rechargeable battery circuit, 4: the invertor, 5: the invertor controller, 6: the rotary sensor, 7: the capacitor, 11 and 11': resistors, 12: the semiconductor switching circuit, 12': the switching circuit, 13: the detector, 14 and 14': switching controllers, and 15: the electric current detector.

PREFERRED EMBODIMENTS

This invention will now be described referring to an embodiment shown in the attached drawings.

Figure 2:
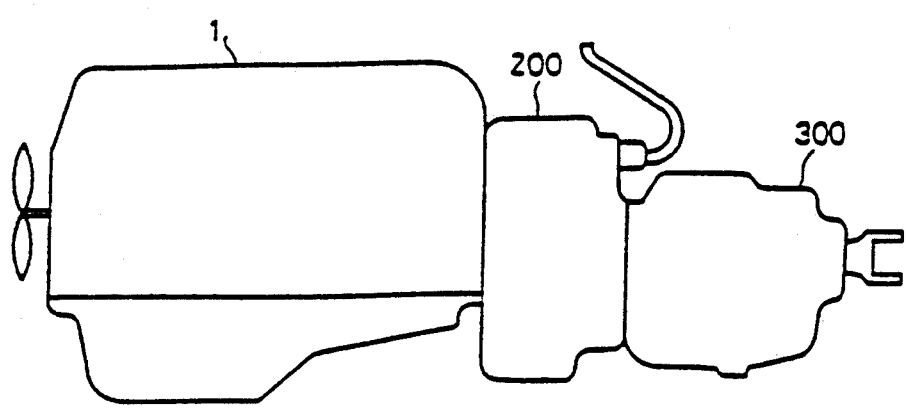
FIG. 2 is a schematic view showing the mounting position of the squirrel-cage polyphase induction machine used in the embodiment of this invention.
Figure 3:
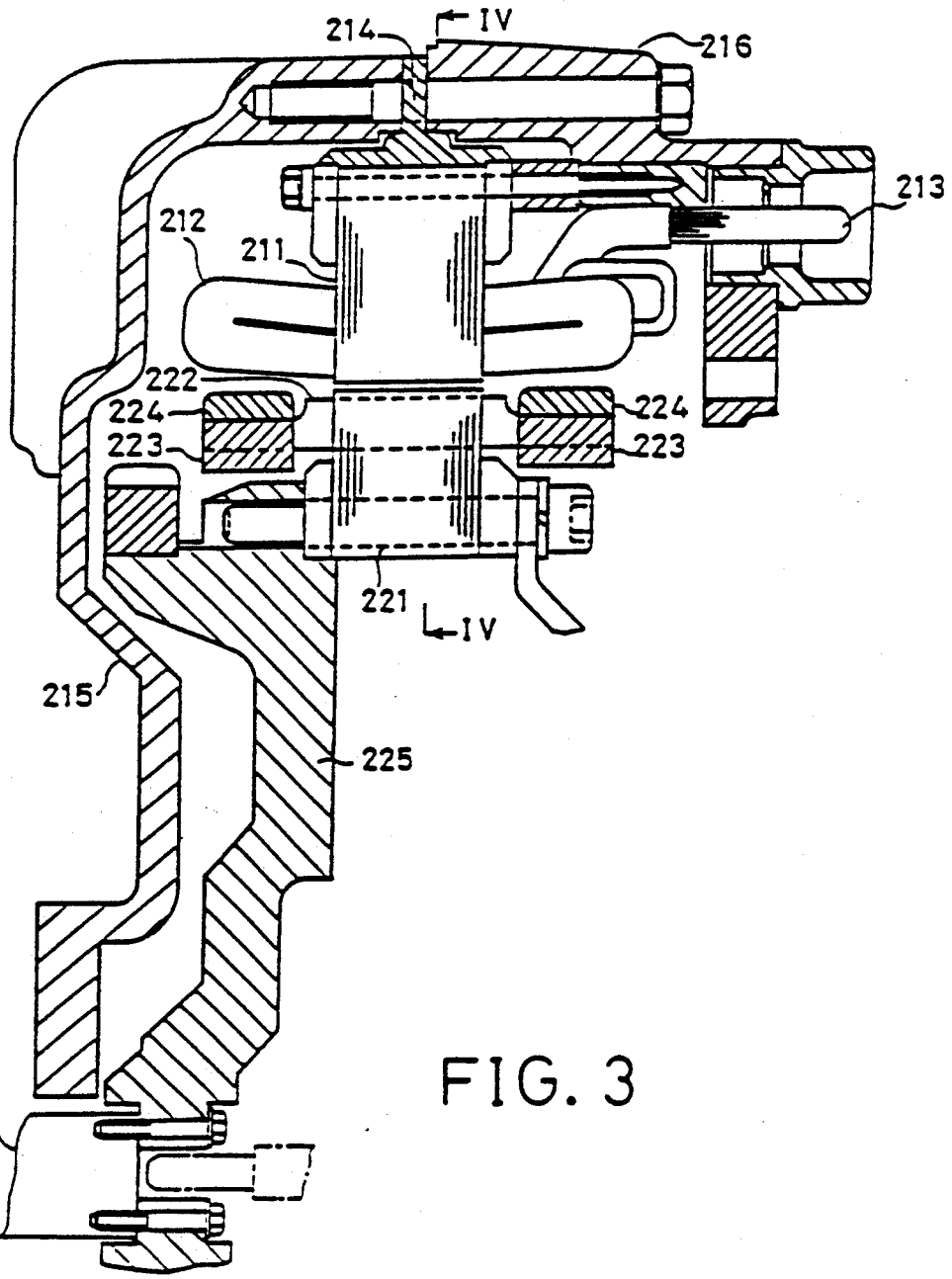
FIGS. 3 and 4 are mechanical structural views of the structure of the squirrel-cage polyphase induction machine used in the embodiment of this invention.
Figure 4:
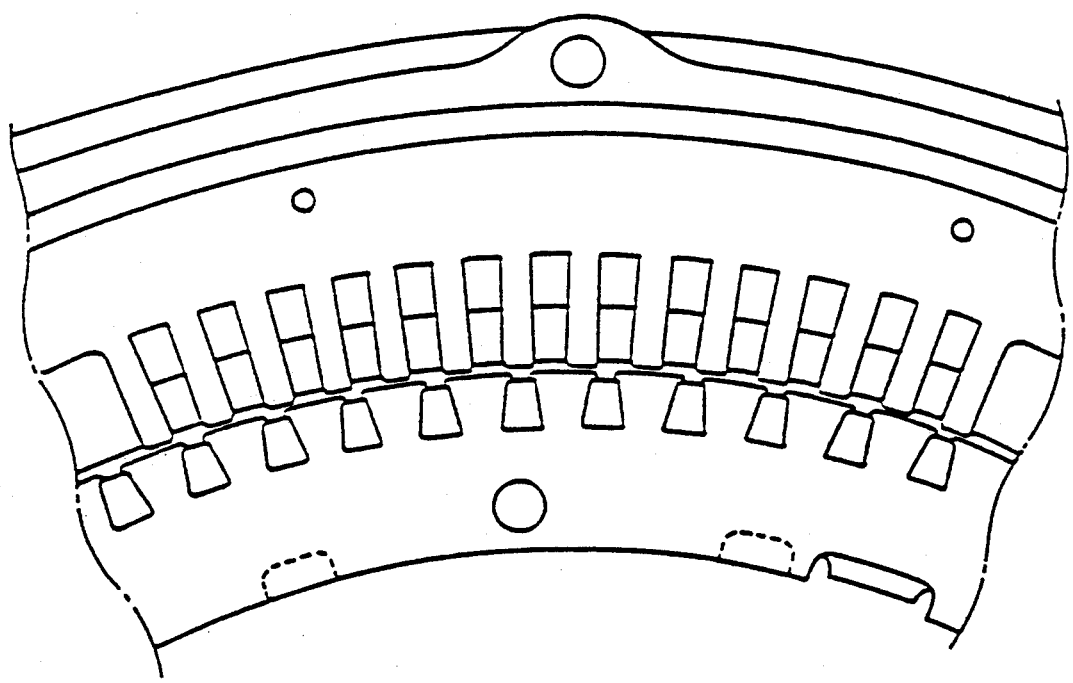

FIG. 1 is a block diagram for the electric structure of the embodiment of this invention. FIG. 2 is a schematic view showing the mounting position of the squirrel-cage polyphase induction machine to be used in the embodiment. FIG. 3 is a view for the mechanical structure of the squirrel-cage type polyphase induction machine partially exploded on a plane parallel to the center of the engine crank shaft. And FIG. 4 is a view showing the mechanical structure the section along the arrow IV—IV in FIG. 3.

As shown in these figures, a rotor of the induction machine is engaged with the flywheel, while a stator is fixed to the flywheel housing.

As this rotary electric induction machine is a squirrel-cage polyphase induction machine, the structure of the rotor is very simple and has no brushes. Compared to the machine of a conventional inductor-type, the gap between the rotor and the stator of the induction machine of this invention is larger, so the magnetic reluctance between the rotor and the stator will not affect significantly the braking performance. In other words, the manufacture precision for the gap between the rotor and stator is not as stringent as that of inductor-type power generators.

The electric construction of this embodiment system is now described in reference to FIG. 1. The system comprises: a squirrel-cage polyphase induction machine 2, whose rotor is directly connected to the internal combustion engine 1, a rechargeable battery 3, an invertor 4 which converts the DC voltage of the rechargeable battery 3 to AC voltage of a frequency suitable for inducing a revolving magnetic field with a revolving speed lower than speed of the axial revolution of the induction machine 2, feeds the same to the induction machine, and converts AC current from the induction machine 2 into DC current, and an invertor controller 5 which generates control signals to set the frequency and voltage of the AC side of the invertor 4. The invertor controller 5 includes a means to generates control instructions from the driver, in accordance with the operational conditions of the motor vehicle.

A rotary sensor 6 is provided on the squirrel-cage induction machine 2. Signals from the sensor 6 are fed to the invertor controller 5, and information on the charging state of the rechargeable battery is fed from the battery 3, as an input.

A capacitor 7 and a semiconductor switching circuit 12 are connected to the output of the invertor and a resistor 11 is connected thereto, via the semiconductor switching circuit 12. The resistor 11 is dissipating excessive electric energy, when electric energy too large to be recovered is generated by braking.

A detector 13 is connected to the circuit 3 and the circuit 12 to detect the output voltage of the invertor 4, while a current detector 15 is provided at the resistor 11 to detect changes in electric current. The detector 15 is provided with a switching control circuit 14 which controls the semiconductor switch circuit 12 in accordance with the detected signals thereof. The circuit 14 is connected to a detector 13.

The mechanical structure of the squirrel-cage polyphase induction machine 2 will now be explained referring to FIGS. 2 through 4.

As shown in FIG. 2, the squirrel-cage polyphase induction machine 2 is mounted internally in a flywheel 200 fixed between the internal combustion engine 1 and the transmission 300. More particularly, as shown in FIG. 3 in a space defined by flywheel housings 215 and 216 of the flywheel 200 are housed a stator core 211, a stator mainly comprising a stator winding 212 inserted in a slot of the core 211 and a lead wire 213, a rotor core 221, and a rotor mainly comprising a rotor bar 222 inserted in a slot of the core 221 and a retaining ring 224 fit on an end ring 223 of the bar 222. The stator core 211 is engaged in the stator ring 214, and the stator ring 214 is fixed to the flywheel housings 215 and 216. The rotor core 221, on the other hand, is fixed to the outer periphery of the flywheel 225 which is driven by the crank shaft 226 of the internal combustion engine 1.

The electric operation of the embodiment is described below.

The rotor of the induction machine 2 is driven by the crank shaft of the internal combustion engine 1 mounted on an automobile. When the vehicle is controlled in braking, by discharging the mechanical energy of the revolution system, the stator winding of the squirrel-cage polyphase induction machine 2 receives a voltage with a frequency suitable for inducing a revolving magnetic field of a speed lower than the revolving speed of the rotor of the induction machine 2 from the invertor 4, to which DC power is supplied from the rechargeable battery 3. This machine 2 converts the mechanical energy of the revolving system into electric energy which is charged in the battery 3 through the invertor 4.

The invertor controller 5 includes a device which controls the invertor 4, the degree of control in accordance with the driving conditions of the vehicle.

In cases where a large braking torque is generated by a certain driving condition in a short period, it is difficult to recycle all the electric energy generated from the squirrel-cage polyphase induction machine 2 to the battery 3. A part of this energy is therefore dissipated as thermal energy from the resistor 11, whose current is controlled by the semiconductor switching circuit 12. The semiconductor switching circuit 12 includes a circuit which monitors the DC terminal voltage and connects the resistor 11 automatically to both terminals of the battery 3, when the terminal voltage exceeds a predetermined level.

Figure 5:
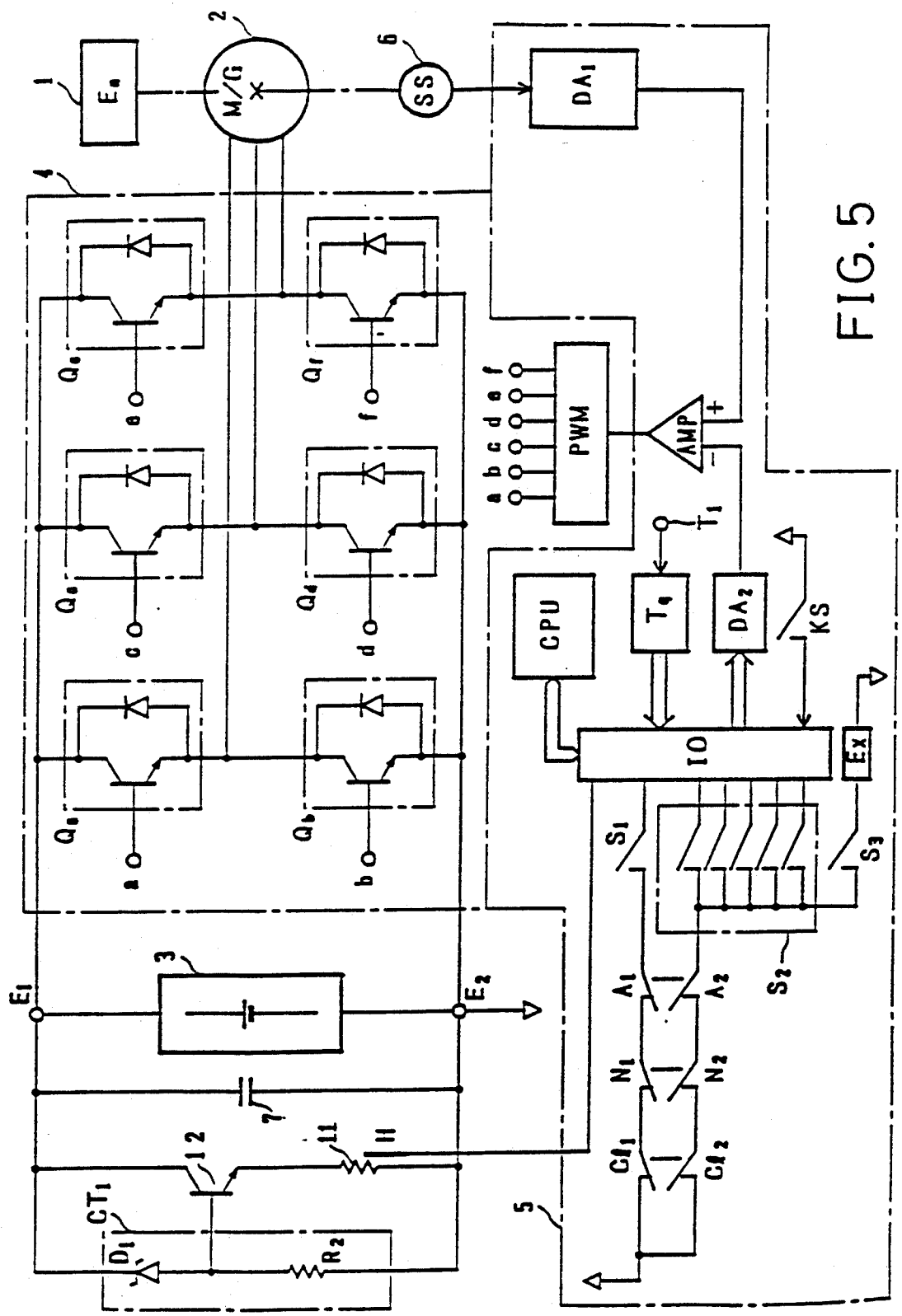
FIG. 5 is an electric circuit diagram in detail of the embodiment of this invention.

FIG. 5 is an electric circuit diagram to show this embodiment in more detail.

In this embodiment, the squirrel-cage polyphase induction machine 2 is of three phases. An invertor 4 connects the rechargeable battery 3 to the squirrel-cage polyphase induction machine 2. The negative terminal E of the battery 3 is connected to the common potential of the motor vehicle.

The invertor 4 includes switching elements Qa, Qb, Qc, Qd, Qe, and Qf, which are connected between the positive and negative terminals of the battery 3 and each of the three terminals of the induction machine 2. These switching elements Qa, Qb, Qc, Qd, Qe, Qf comprise of transistors and diodes which are connected in parallel but in opposite directions between the collectors and emitters of the transistors. The invertor 4 includes an ON-OFF control signal generator PWM which feeds control signals to the control electrode of each switching element Qa, Qb, Qc, Qd, Qe and Qf.

The invertor 4 is for the motor vehicle and has been specially designed in order to test this invention, but the basic technology thereof is well known. The technology for controlling a revolving magnetic field of the squirrel-cage polyphase induction machine in accordance with the rotation of the rotor is one application of a common technique popularly used in AC elevators and cranes.

A rotary sensor 6 is mounted on the squirrel-cage polyphase induction machine 2 or the internal combustion machine 1 to detect the revolution of the crank shaft thereof and to send electric pulse signals. The pulse signals sent from the rotary sensor 6 are converted to an analog signal by a digital to analog converter DA1, which indicates revolving speed. The analog signal is fed to one of the input terminals of the operational amplifier AMP, and a control reference corresponding to the slip generated by the digital to analog converter DA2 is fed to another input terminal of the amplifier AMP, where these two signals are subtracted or added, depending on their polarity. The output from the operational amplifier AMP is given to the ON-OFF controller PWM as the control signal for the output frequency of the invertor 4. On these circuit connections, a negative feedback servo control loop is formed by the squirrel-cage polyphase induction machine 2, the rotary sensor 6, the digital to analog converter DA1, the operational amplifier AMP, and the invertor 4.

The control reference corresponding to slip is thus subtracted or added to the negative feedback servo control loop. Signals for the controller means which generate the slip will now be described. The controller means has circuits illustrated in the lower left part of FIG. 5, including: a microprocessor CPU, an interface circuit IO, a torque controller Tq, switches A1 and A2 linked with a throttle pedal of the vehicle, where switch A1 opens and switch A2 closes when the throttle pedal is pressed, switches N1 and N2, both of which open at the neutral position of the transmission, switches CL1 and CL2 which are linked with the clutch pedal, both open when the clutch pedal is pressed, the first switch S1 which is manipulated by the driver, the second switch S2 which is manipulated by the driver, switch KS linked with a start key switch of the internal combustion engine 1 and a digital to analog converter DA2. The switch S3 is a conventional exhaust brake switch which is connected to the exhaust brake circuit Ex.

Figure 6:
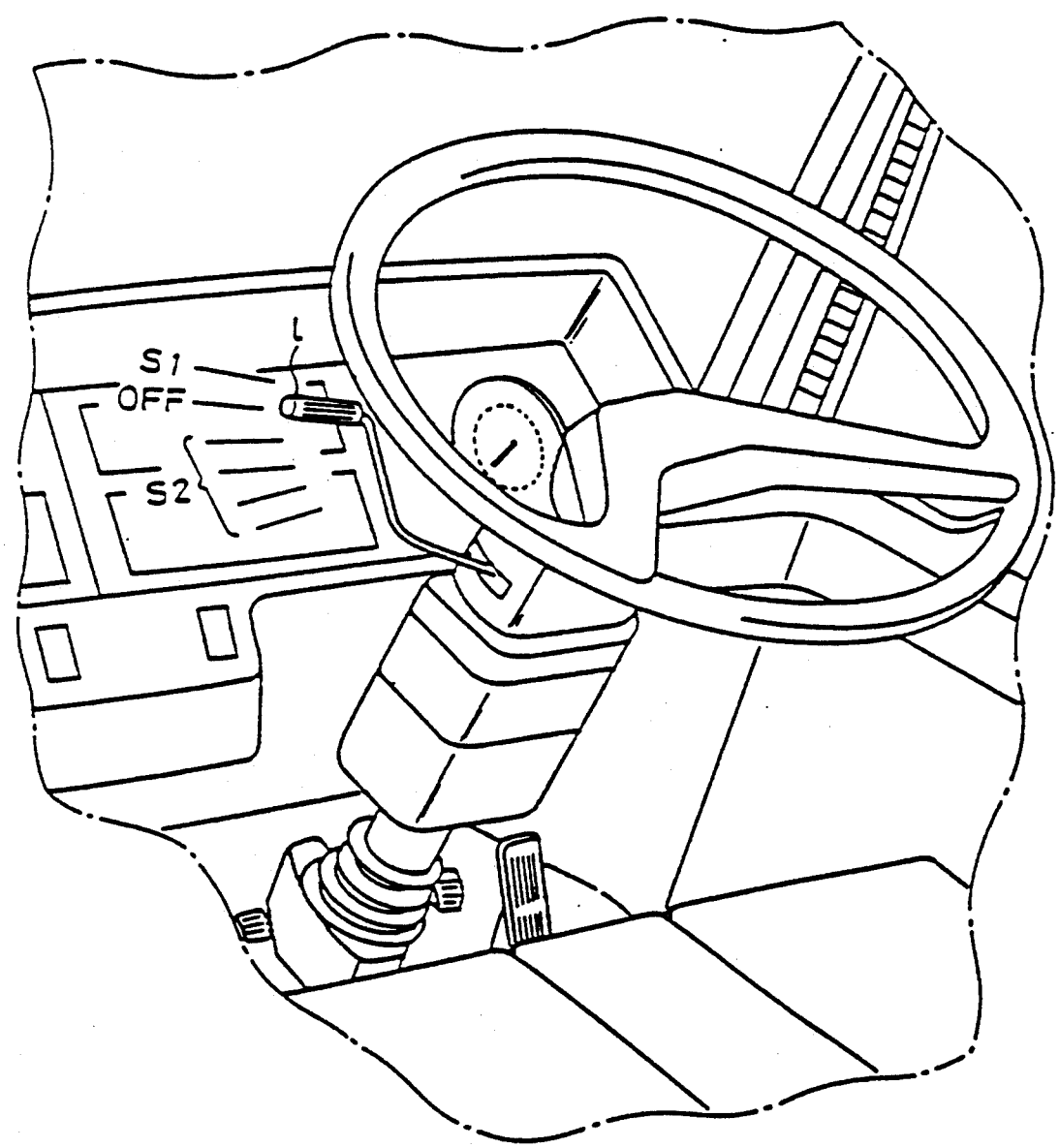
FIG. 6 is a perspective view of the steering wheel and switches of the embodiment of this invention.

The first switch S1 is for instructing auxiliary acceleration, while the second switch S2 is for instructing electric braking to perform. In this embodiment these switches S1 and S2 are designed to be operated by a lever L which is mounted on the steering column as shown in FIG. 6. When the lever L is positioned at OFF, both switches S1 and S2 are open, and when it is moved to the upper position for acceleration, the switch S1 is closed. Four positions are marked at the lower position for braking, and plural contacts shown in switch S2 of FIG. 5 are closed in accordance with the selected position of lever L. By using the four braking positions, the driver can select the degree of electric braking power.

When the lever L is shifted to the upper position for acceleration, the degree of acceleration is determined by the position of the throttle pedal. The data on the position of the pedal is fed to a terminal T1 in FIG. 5 which sends it to the torque controller Tq, which gives control data to the interface IO. The interface IO also receives the output from the temperature sensor H mounted on the resistor 11 as an input.

This experimental system, embodying the aforementioned mechanism, has achieved a braking force as high as 100 HP, and a driving force of several tens of HP, where the driving force is depending on the characteristics of the rechargeable battery. This experimental result verifies utility of the system sufficiently. In this embodiment, the rotor of the squirrel-cage polyphase induction machine 2 is attached on the flywheel of the internal combustion engine 1. The diameter of the flywheel housing is about 700 mm.

The large components among these parts of the control system for the above embodiment in FIG. 5 are the invertor 4 and the rechargeable battery 3. It is recognized that a conventional battery for common automobiles or a slightly larger battery can be selected for the rechargeable battery 3. Although the invertor 4 has voluminous switch elements Qa, Qb, Qc, Qd, Qe, and Qf, total volume of the invertor of the test system is about 80 liters, which may generate braking force of about 150 HP. The size was small enough to be mounted on the underside of the body of a medium-sized truck. The volume can be reduced through the future development efforts. The invertor 4 comprises stationary electric parts without movable elements, for example switch elements Qa, Qb, Qc, Qd, Qe, and Qf which may be able to be installed in different locations of the vehicle. It is thereby possible to design practical forms for various types of motor vehicles.

The driving performance of the system is similar to the driving of a vehicle with a conventional exhaust braking system and it is verified that a useful driving performance is sufficiently attained.

As the rotary electric machine of this system is of a squirrel-cage polyphase inductin type, the rotor means is very simple in structure, and it is durable, light, and does not have any frictional parts such as brushes. In the experiment, the gap between the rotor and the stator in the system has been set at about twice the distance as the conventional inductor type. It revealed that the trial system with the large gap does not present any particular problem, and that an even wider gap may be possible. It is, therefore, recognized that this invention requires less stringent manufacturing precision which is therefore highly advantageous for mass production. It has also been noted that the squirrel-cage type structure generates almost no magnetic noise from the rotor, and that the noise of the stator is remarkably less than that of conventional inductor type retarders.

Although a squirrel-cage induction machine of three phases is employed in the above embodiments, it may be possible to employ multiphase type machines of larger number of phases. By increasing the number of phases the electric current for one phase can be reduced. This is more advantageous for smaller motor vehicles, where parts of the invertor are distributed within different spaces of the vehicle.

The electric operation and the control of the invertor 4 will now be described.

When braking force is required for the rotary system, the invertor controller 5 issues control signals for generating the revolving speed of the magnetic field which is less than the mechanical revolving speed of the rotor of the induction machine 2 detected by the sensor 6. At this time the squirrel-cage polyphase induction machine 2 acts as a power generator, and the electric energy generated is converted into DC energy by the invertor 4 and the DC energy is fed to the rechargeable battery 3. When braking torque is too large to be absorbed by the battery 3, the terminal voltage of the battery 3 increases to exceed the predetermined level, and the semiconductor switching circuit 12 is closed to connect the terminal of the battery 3 with the resistor 11.

When driving force is required for the rotary system, the invertor controller 5 issues control signals for generating the revolving speed of the magnetic field which is higher than the mechanical revolving speed of the rotor of the induction machine 2 detected by the sensor 6. At this time, DC current is taken out from the rechargeable battery 3. DC current is converted to polyphase AC current corresponding to the revolving magnetic field by the invertor 4, and is fed to the squirrel-cage polyphase induction machine 2.

The larger the difference between the revolving speed of the revolving magnetic field and the axial revolving speed, the larger the braking torque or driving force becomes. In this embodiment, the ratio of the difference against the revolving speed of the rotary magnetic field, i.e. the slip of the squirrel-cage polyphase induction machine 2 is restricted within ±10%.

Description will now be given to the control over the charge of the rechargeable battery. The invertor 4 is fed with control signals from the invertor controller 5 for inducing a revolving magnetic field corresponding to the revolution of the rotor on the stator of the induction machine 2. The invertor controller 5 is fed with revolution data from the sensor 6 and with the data on the charging state of the battery 3. The invertor controller 5 includes a microprocessor. The invertor controller 5 includes a means to take in operation control signals which are changed by the manipulation of the driver.

As is described above, the invertor 4 can feed energy from DC terminals to AC terminals, as well as the energy from AC terminals to DC terminals. The invertor can further operate the squirrel-cage polyphase induction machine 2 as a polyphase motor by controlling the revolving speed of the revolving magnetic field, depending on the control signal from the invertor controller 5, and the induction machine 2 gives driving force to the rotary shaft. Thereby the induction machine 2 works as an auxiliary engine device for the internal combustion engine 1. For this purpose the electric energy charged at the battery 3 is used.

Conventionally, the charging current for a rechargeable battery of a motor vehicle is fed from a generator driven by the internal combustion engine, and charging is continued as long as the internal combustion engine rotates. When the charged energy is exhausted by the operation of the starter motor or other equipment, the charging current to the battery is controlled to attain a fully charged state to the rated capacity in as short a time as possible.

However, in the technology where the energy generated for braking is recycled as electric energy and is used as an auxiliary power for running the vehicle as above, it can not effectively recover braking energy to improve fuel efficiency if the rechargeable battery is constantly maintained at a fully charged state to the rated capacity. If the target capacity for charging is set at a very low level to the rated capacity, on the other hand, the charged energy is exhausted when the starter motor is repeatedly used at a certain driving condition.

In this invention, therefore, the target capacity for charging the rechargeable battery is selected to be smaller than the rated capacity at normal conditions. The target capacity must depend on various conditions, such as braking performance, driving conditions, the rated charging capacity of a rechargeable battery, and temperature. The target capacity may be 50 to 70% of the rated capacity.

When the electric energy recycled and charged increases to exceeds the above preset target level, the system issues an alarm urging the driver to use the auxiliary driving force. Then the electric energy is fed to the squirrel-cage polyphase induction machine 2 by the driver's operation, and its effective use is attained.

As for information on the charging state of the rechargeable battery, which is to be supplied to the invertor controller 5, this embodiment employs a method to monitor the terminal voltage of the battery for discrimination. The method is not precise but useful. In order to improve precision, the system may employ methods to either monitor the density of battery liquid, or to measure and calculate the electric charge and discharge of the battery.

The system may employ a method for reducing fuel consumption of the internal combustion engine by warning the driver that the charged electricity in the battery is excessive and urging him to use the auxiliary driving force. Another method that can be employed is to incorporate a microprocessor in the invertor controller 5, which receives information that the charged energy is exceeding the preset target level, and which automatically controls the squirrel-cage polyphase induction machine 2 to operate as a motor, even during normal driving, in accordance with the pressed value of the throttle pedal.

The control for electric braking and auxiliary acceleration of this invention is described below.

As shown in FIG. 5, a rechargeable battery 3, the serial circuit of a resistor 11, and a semiconductor switching circuit 12 are connected to the DC terminal E1 and E2 of the invertor 4. A controller CT1 is connected to the control electrode of the semiconductor switching circuit 12.

In this embodiment the controller CT1 is independent of the controlling system, including the aforementioned microprocessor CPU1, so that when the voltage between the terminals E1 and E2 exceeds the target level, the semiconductor switching circuit 12 is automatically actuated. A temperature sensor H is provided on the resistor 11 which is connected in serial manner to the semiconductor switching circuit 12, and the output from the sensor H is fed to the interface circuit IO. When the temperature of the resistor 11 exceeds the preset value, the slip of the revolving magnetic field may be decreased thereby reducing braking torque.

Figure 7:
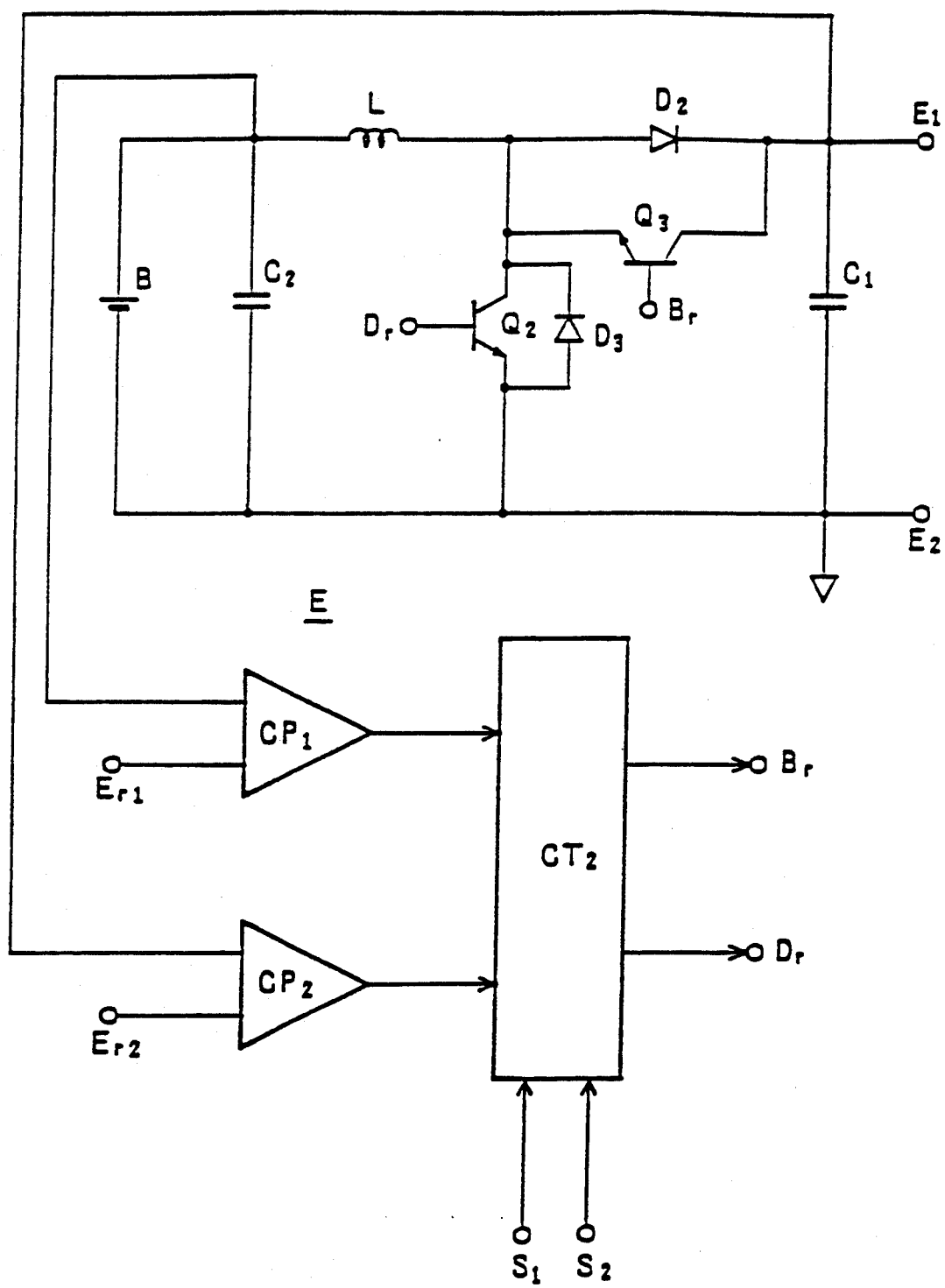
FIG. 7 is a circuit diagram of the DC power source of the embodiment of the invention.

Operational voltage between the terminal E1 and E2 is in the range of 300–600V. In this embodiment, a circuit shown in FIG. 7 is employed in order to match the voltage above to the voltage of the battery at 24 V, the conventional battery voltage of a large motor vehicle. Terminals E1 and E2 in FIG. 7 are connected to the terminals E1 and E2 in FIG. 5. The capacitor C1 is connected to terminals E1 and E2. The rated voltage of the battery B is 24 V. The capacitor C2 is connected to the battery B. Between the positive terminal of the battery B and terminal E1 serial circuit of a reactor L and a diode D2 for countercurrent prevention are inserted. Between the connection of the reactor L with the diode D2 and the terminal E2, a collector/emitter circuit of the transistor Q2 is connected. A collector/emitter circuit of the transistor Q3 is connected in parallel to the diode D2.

As shown in the lower half of FIG. 7, this circuit includes two comparators CP1 and CP2 and a controller CT2 to feed a controlling pulse to the transistors Q2 and Q3 shown as Dr and Br respectively. The transistor Q2 is used when the induction machine 2 works as a motor. The transistor Q3 is used when the induction machine 2 works as a generator. The controller CT2 receives as input the operation data of the first and second switches S1 and S2, which are described in relation to FIG. 5. The first switch S1 and the second switch S2 are manipulated by the driver, and the first switch S1 is closed for auxiliary acceleration while the second switch S2 is closed for electric braking.

When the first switch S1 is manipulated and the squirrel-cage polyphase induction machine 2 works as a motor, the controller CT2 selects the terminal Dr. By setting a much shorter pulse than the repetition period on the terminal Dr of the transistor Q2, the voltage of the battery B is applied for a short period of time on the reactor L, which is followed by a generation of high voltage.

The sum of the voltage at the two terminals of the reactor L and the terminal voltage of the battery 3 is supplied to the capacitor C1 through the diode D2. The terminal voltage of the capacitor C1 becomes the DC power source voltage for the squirrel-cage polyphase induction machine 2, when it acts as a motor. The DC power source voltage is compared with the reference voltage Er2 by a comparator CP2, and the pulse width and repetition period thereof are adjusted to keep the voltage in the preset range.

When the second switch S2 is manipulated for the squirrel-cage polyphase induction machine 2 to work as a generator, the controller CT2 selects the terminal Br. At this time, periodic pulses are fed to the control input terminal Br of the transistor Q3 to intermittently actuate the transistor Q3. This intermittent operation forms an intermittently closed loop between the capacitor C1 (terminals E1 and E2), capacitor C2, the reactor L, and the transistor Q3 so as to store energy in the reactor L. When energy in the reactor L increases and the terminal voltage of the reactor L becomes larger than the terminal voltage of the battery B, a closed loop in the opposite direction of current is formed between the reactor L, the battery B, and the diode D3 to allow passage of electric current and to charge the battery B. The terminal voltage of the battery B and the terminal voltage of the capacitor C2 are compared with the reference voltage Er1 by the comparator CP1, and the pulse width and repetition period thereof are adjusted to keep the voltage in the preset range.

Operational modes of the mechanism can be roughly classified into three groups;
(1) Generating mode (the induction machine works as a generator)
(2) Driving mode (the induction machine works as a motor)
(3) Halting mode (the rotor stops)

In the generating mode (1), the squirrel-cage polyphase induction machine 2 acts as a power generator, and this mode is further divided into two categories;
(1)a Braking mode
(1)b Running mode.

In the braking mode (1)a, which is the mode where the vehicle is braked, a large amount of energy is generated by the squirrel-cage polyphase induction machine 2, part of which is recovered by the battery B, but most of which is dissipated by the resistor 11. In this mode (1)a, the slip of the revolving magnetic field to be fed to the induction machine 2 is controlled to remain negative at a high level. This mode is determined by the driver closing the second switch S2. It is controlled to generate an increasingly larger braking torque by closing the contacts of the second switch S2 in sequential steps.

The running mode (1)b is the mode for normal driving of the car where a relatively small amount of energy is generated by the squirrel-cage polyphase induction machine 2, to be gradually but continuously charged in the rechargeable battery B. In this mode, the slip of the revolving magnetic field to be given to the induction machine 2 is controlled to be negative and low. When the first and second switches are open, the control mode is automatically shifted to this mode.

The Driving mode (2) can be further divided into
(2)a auxiliary driving mode and
(2)b starting mode.

In the mode (2)a, the induction machine 2 acts as a motor to give the internal combustion engine 1 additional driving force, when extra engine torque is needed for starting or climbing uphill. This is realized by controlling the slip of the induction machine 2 to be positive, through the manipulation of the first switch S1 by the driver. Slip is controlled in accordance to the value generated from the torque controller Tq corresponding to the pressure applied on the throttle pedal. In this mode, part of the driving torque of the vehicle is supplied by the induction machine.

In the starting mode (2)b, when the internal combustion engine 1 is actuated from a halted state, the revolving force is fed from the induction machine 2 instead of conventional DC starter motor. For this purpose, a slow revolving magnetic field such as 200 rpm is given to the induction machine 2. This eliminates the need for a starter motor, pinion gears, magnet switches, and other facilities, which are normally required for starting.

In the generating mode (1) above, the system gives revolving magnetic field a speed slower than the actual revolving speed of the rotor, or a negative slip to the induction machine 2. The induction machine 2 works as a generator, and the electric current for the rotary magnetic field is fed through the transistor parts of the switching elements Qa, Qb, Qc, Qd, Qe and Qf. The electric energy generated by the induction machine 2 is recycled to the battery 3 through the diode parts of switching elements Qa, Qb, Qc, Qd, Qe and Qf. When a large braking torque is temporarily needed, and when the generated energy becomes too large to be recovered, the terminal voltage of the battery 3 is increased and the semiconductor switching circuit 12 is closed to dissipate the energy from the resistor 11 as thermal energy. When the thermal energy continues to be at large value in the resistor, the slip of the rotary magnetic field is controlled through the output from the temperature sensor H, to be less and braking force is reduced, in order to keep the system within a safe working range.

In the driving mode (2) above, the induction machine 2 is given a positive slip whereby revolving speed of the rotary magnetic field is greater than that of the rotor of the induction machine 2. This makes the induction machine 2 work as a motor by giving revolving force to the crank shaft of the engine 1.

How to control the resistance of the resistor 11 which dissipates thermal energy in the system will now be described.

Figure 8:
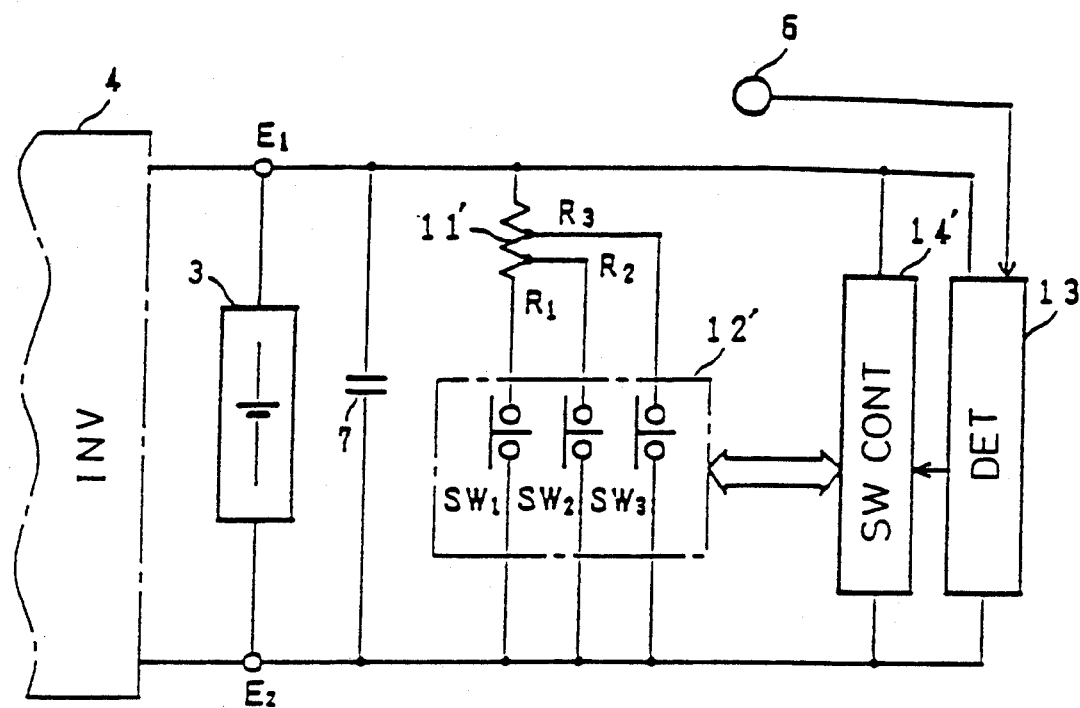
FIG. 8 is a block diagram of another structure of the DC power source of another embodiment of this invention.

Various tests have been conducted on the above embodiment and inventors have found that, while the vehicle is running over a certain high revolving speed of the engine, and when the system is operated at braking mode, braking torque suddenly becomes extremely low. The inventors have studied the phenomenon in detail to learn that it can be avoided by selecting the value of the dissipating resistor 11. More specifically, when the induction machine is used as a generator, and when the revolving speed thereof is very high, the output voltage is suddenly reduced in the region of a smaller magnetic field to thereby lower the output power from the generator. It means that in this situation, the dissipated power ($V^2/R$) in the small value of the resistor 11 exceeds the output of the generator. In order to avoid this, the value of the resistor 11 should be changed in accordance with the revolving speed at the time of braking. FIG. 8 shows an embodiment of the control circuit to achieve such a purpose.

FIG. 8 is a block diagram which shows an embodiment of a circuit which detects the revolving speed of the crank shaft and controls the resistance value of the resistor 11. The circuit may be constructed by: inserting a resistor 11' with ON-OFF switches SW1, SW2, and SW3 which can select resistance value of R1, R2, and R3 between terminals E1 and E2 of the invertor 4, connecting a switch controller 14' which controls the ON-OFF switches SW1, SW2 and SW3, and connecting a detector 13 which detects the output voltage and gives a signal to the controller 14'.

Inventors have conducted various tests on the above embodiment and they have found that the controllable range can be expanded by switching the ON-OFF switches SW1, SW2, and SW3 in accordance with the signals detected relating to revolving speed.

Figure 9A:
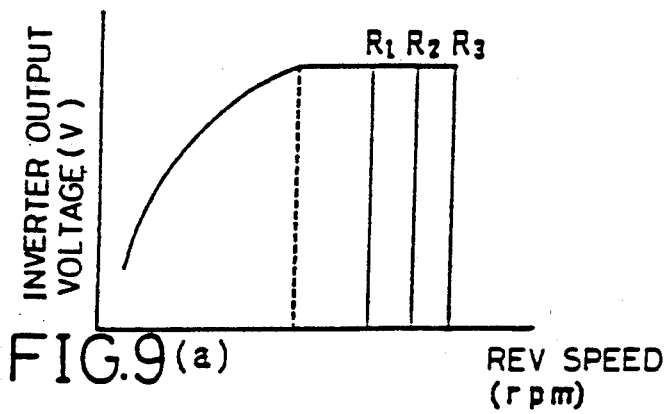
FIGS. 9a and 9(b) shows invertor output voltage and braking torque corresponding to revolving speed in the embodiment of this invention.
Figure 9B:
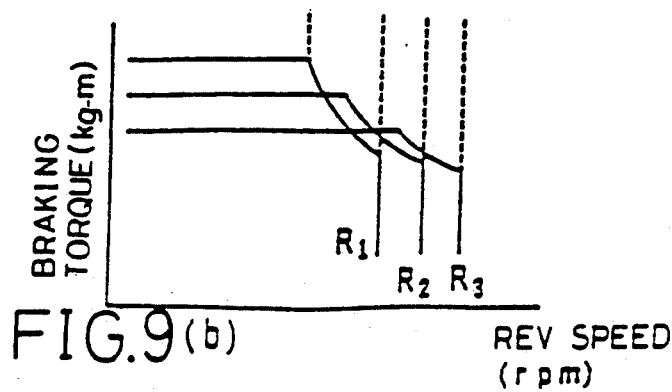

FIGS. 9(a) and 9(b) show the output voltage and braking torque of the invertor in relation to revolving speed. As shown in FIG. 9(a), the resistance is increased as R3, R2 and R1 while the revolving speed increases. In such manners the invertor output voltage can be maintained at a substantially constant value. Moreover, although braking torque slightly lowers as the revolving speed increases, the braking torque remains at a sufficiently practical level. It has been thus found that the resistance should be changed in order to carry out braking over a wide range.

After further research inventors learned the better method, in which the duty ratio (the ratio of the time the switch is ON against the ON-OFF period) to control the semiconductor switch is changed when output voltage from the invertor 4 exceeds a predetermined level, and the substantial value of the resistor 11 can effectively be varied.

Figure 10:
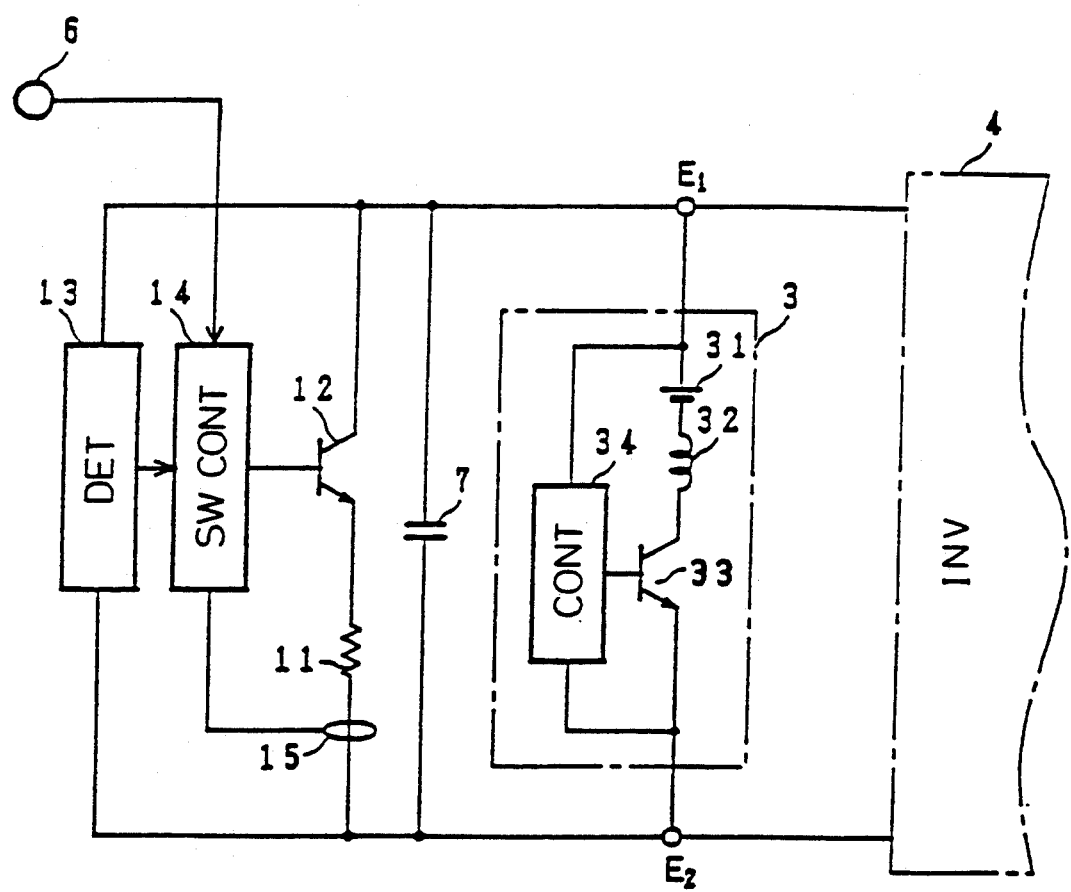
FIG. 10 is a block diagram for the structure of the DC power source of the embodiment of this invention.

FIG. 10 is a block diagram which shows the structure of this circuit wherein terminals E1 and E2 are connected to the terminals E1 and E2 of FIG. 5. In this embodiment the circuit comprises: a capacitor 7 connected to the terminals E1 and E2 of the invertor 4, a low value resistor 11 to which electric current generated in the stator winding of the induction machine 2 is fed through the invertor 4, a semiconductor switch 12 connected between the resistor 11 and the invertor 4 for switching the circuit, a detector 13 which detects the voltage applied thereon from the invertor 4, a switch controller 14 which controls the substantial value of the resistor 11 to increase as the output detected by the circuit 13 and the rotary sensor 6 increases, and an electric current detector 15 provided on the resistor 11 which detects the changes in electric current and outputs detection signals to the switch controller 14.

The rechargeable battery circuit 3 includes a rechargeable battery 31, a reactor 32, a semiconductor switch 33, and a controller 34.

The operation of the system with above structure will now be described. Description will be primarily made referring to control of the resistor 11 by detecting the voltage from the invertor 4.

When the revolving magnetic field of a revolving speed corresponding to a generator is given to the stator winding of the squirrel-cage polyphase induction machine 2 whose rotary shaft is coupled with the crank shaft of the engine 1, AC current is generated in the stator winding. This AC current is converted into DC current by the invertor 4 and it is applied on terminals E1 and E2.

The detector 13 detects the voltage and send a signal to the switch controller 14. When the detected output voltage exceeds the preset level, the switch controller 14 controls the resistor 11 by giving ON-OFF control signals to the semiconductor switching circuit 12 in order to increase the substantial value of the resistor 11.

FIGS. 11(a), 11(b), 11(c) and 11(d) show the relationship between revolving speed of the crank shaft of the engine 1 and DC output voltage, braking torque, duty ratio, and the substantial resistance of the invertor 4.

Figure 11A:
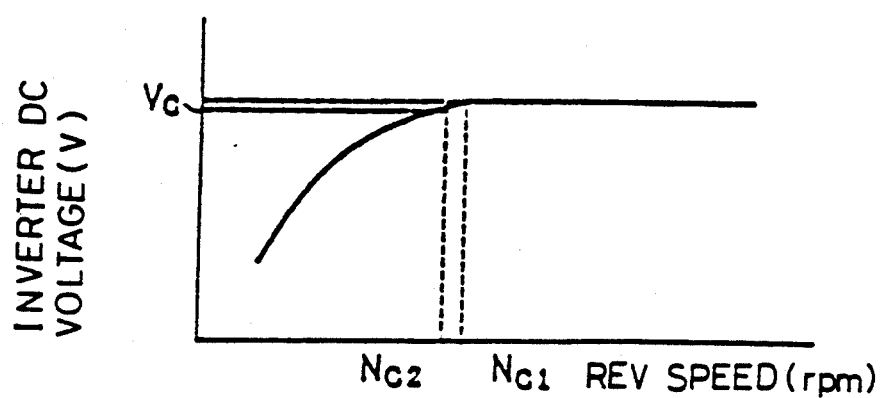
FIGS. 11(a), 11(b), 11(c) and 11(d) shows invertor output voltage, braking torque, duty ratio and substantial resistance value corresponding to revolving speed in the embodiment of this invention.
Figure 11B:
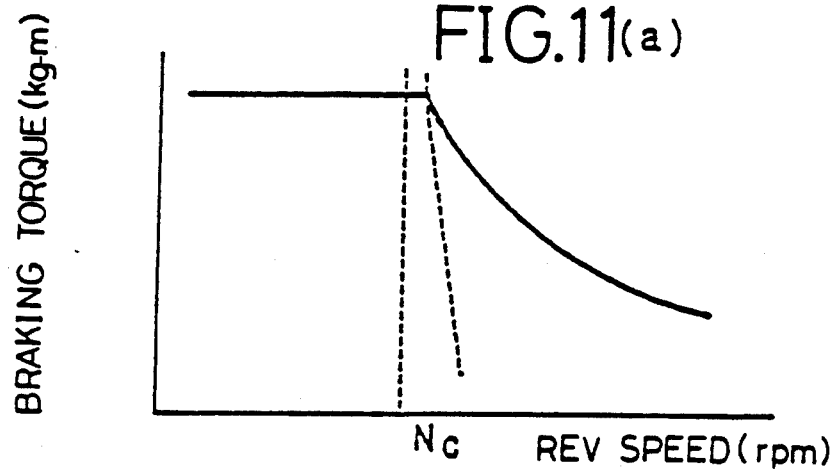

As shown in FIG. 11, when the revolving speed of the engine 1 increases from zero to reach a certain value of speed Nc1, the braking torque starts decreasing, as shown by the dotted lines in FIG. 11(b). When the speed reaches from zero to the point Nc2 which is slightly below Nc1, the detector 13 detects the corresponding output voltage Vc and sends detection signals to the switch controller 14. In accordance with the detection signals, the switch controller 14 sends the semiconductor switching circuit 12 ON-OFF instructions. As a result, the duty ratio of the semiconductor switching circuit 12 decreases following the revolving speed increases, and the ON-OFF control signals with reduced duty ratio as shown in FIG. 11(c) are given to the semiconductor switching circuit 12.

Figure 11C:
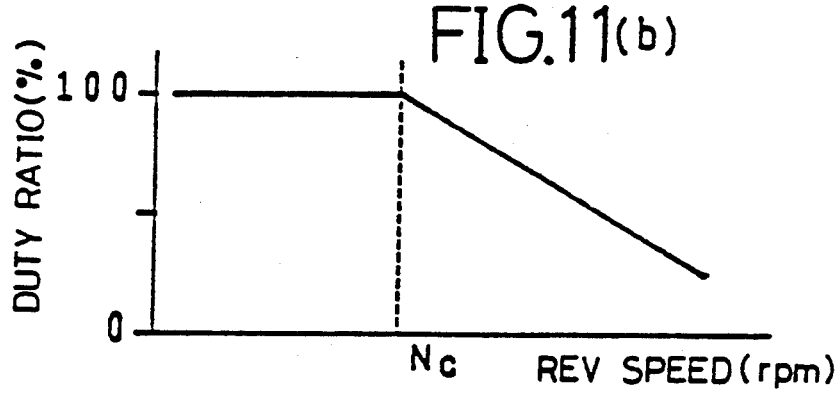
Figure 11D:
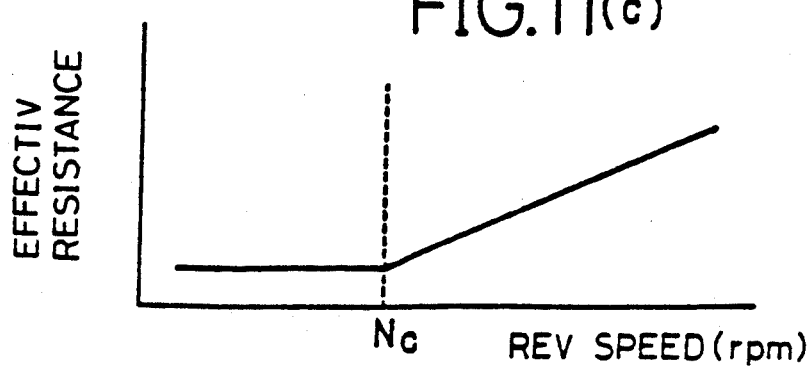

To follow the operation of the semiconductor switching circuit 12 in accordance with the ON-OFF control signal the substantial resistance of the resistor 11 increases as shown in FIG. 11(d). This improves the matching between the generator and its load, in the region where revolving speed is high. And this improvement widens the application range of electric braking for this mechanism.

Inventors have also found that delay in response occurs when control is performed with detected output of the invertor DC voltage alone. Therefore, the revolving speed of the engine 1 detected by the sensor 6 is given to the controller in advance, and auxiliary control or duty ratio control in accordance with the revolving speed is performed as shown in FIG. 11(c). After the invertor DC voltage is detected the control pattern is corrected by the aforementioned ON-OFF control. This further expands the range of stable braking torque.

The results of various tests have further revealed another problem, although this problem is less important than the problem above. When electric braking is applied continuously for a long time, the temperature of the resistor 11 rises to increase its resistance which at the same time gradually decreases braking torque. This problem can essentially be solved by using a resistor with a lower temperature coefficient, but in practice it is difficult to obtain a low cost resistor of low temperature coefficient. Therefore, substantial resistance of the resistor 11 should be made lower by using the aforementioned circuit when it is used for braking for a long time.

For this purpose inventors have tried to control substantial value of the resistor 11 by detecting the electric current which is passing through the resistor 11. On this method substantial value is controlled when the current becomes smaller compared with the DC voltage applied to the resistor. Inventors have also tried another method to control substantial value of the resistor 11 providing a temperature sensor on the resistor 11. On this method the control is performed when the output from the sensor shows higher temperature than predetermined value.

When braking is continued, and the electric power dissipation continues for a long time, the temperature of the resistor 11 is elevated. The detector 15 detects elevation in temperature in the resistor 11, in terms of electric current, and sends the detection output to a switching controller 14. The switching controller 14 gives ON-OFF control signals with changing a duty ratio to the semiconductor switching circuit 12, so that substantial value of the resistor 11 can be kept low value.

Figure 12A:
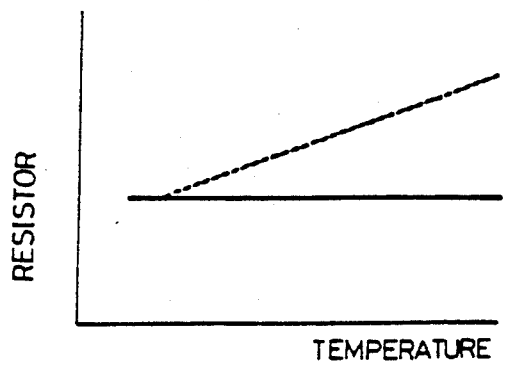
FIGS. 12(a), 12(b) and 12(c) shows value of the resistance and duty ratio corresponding to temperature of the resistor, and also shows substantial value of the resistance corresponding to duty ratio.
Figure 12B:
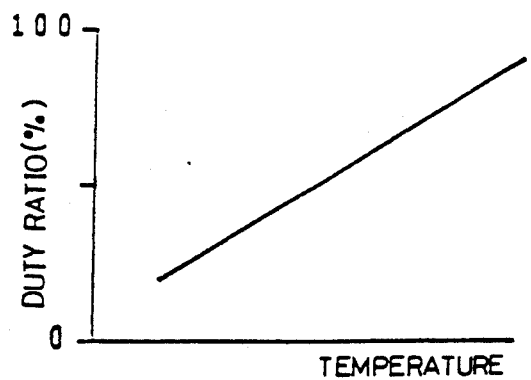

FIG. 12(a) shows the relation of temperature to resistance. FIG. 12(b) the relation of temperature to duty ratio and FIG. 12(c) the relation of duty ratio to substantial resistance.

Figure 12C:
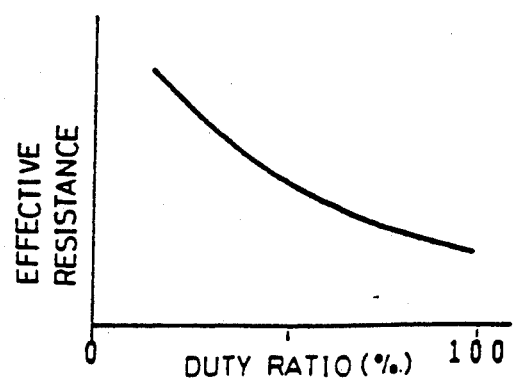

When the temperature of the resistor 11 increases, resistance increases, as shown by the dotted line in FIG. 12(a), and the electric power dissipated from the resistor 11 as thermal energy decreases. The duty ratio, on the other hand is controlled to increase with the rise in temperature as shown in FIG. 12(b). Substantial resistance decreases with the increase in duty ratio as shown in FIG. 12(c).

Increase in temperature of the resistor 11 is detected as electric signals by the detector 15, and these signals are sent to the switching controller 14 so that an ON-OFF control signal is transmitted to the semiconductor switching controller 12 for increasing duty ratio, and resistance is made lower substantially as shown by the solid line in FIG. 12(a). This enables the dissipation of a large amount of electric power over a longer time so as to maintain braking torque.

The invertor 4 may also be controlled with electric signals detected increase in temperature of the resistor 11, as following manners. In FIG. 1, when the induction machine 2 act as a generator, AC current is generated on the stator winding of the induction machine. It is converted by the invertor 4 into DC current and is applied to the resistor 11 for dissipating electric power. When dissipation of electric power is continued for a long time, the temperature of the resistor 11 rises. The detector 15 detects the increase in temperature on the resistor 11 from its electric current, and transmits the detection output to the invertor controller 5. The invertor controller 5 may control the pulse width in order to increase output voltage of the invertor. The invertor controller 5 may also control the revolving speed of the magnetic fields of the induction machine in order to increase output voltage of the invertor.

Figure 13A:
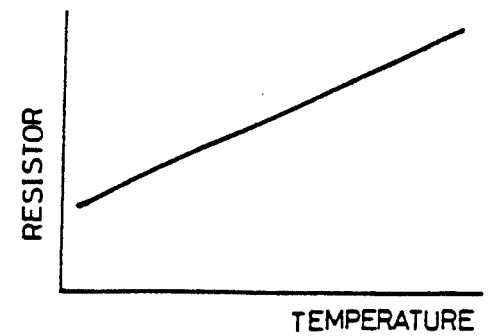
FIGS. 13(a), 13(b) and 13(c) shows value of the resistance, dissipation power and generated voltage corresponding to temperature of the resistance.
Figure 13B:
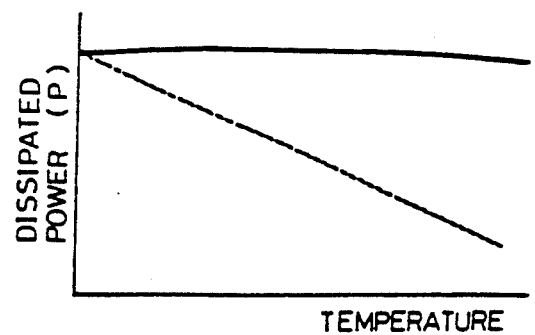
Figure 13C:
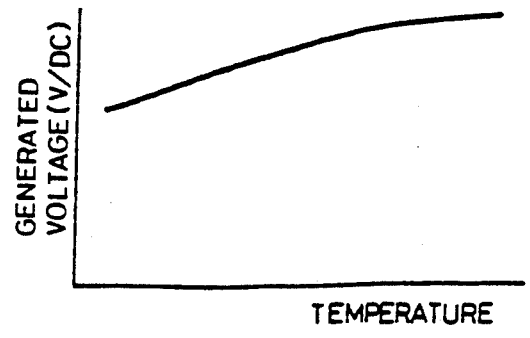

FIGS. 13(a), 13(b), and 13(c) show the relation of temperature increase to resistance (R), dissipated power (P), and generated voltage (V).

When temperature rises in the resistor 11, as shown in FIG. 13(a), resistance (R) of the resistor 11 increases and dissipated electric power decreases as shown in the dotted line of FIG. 13(b). The detector 15 detects increase in temperature in the resistor 11 as electric signals, and the voltage (V) generated by the invertor 4 is increased by the invertor controller 5 in accordance with the temperature to thereby maintain power dissipation at a high level as is shown by the solid lines in FIG. 13(b).

The operation and structure of embodiments other than those stated above are identical, in relation to FIGS. 1 and 5. For the sake of simplicity, overlapping descriptions have been omitted.

Figure 14:
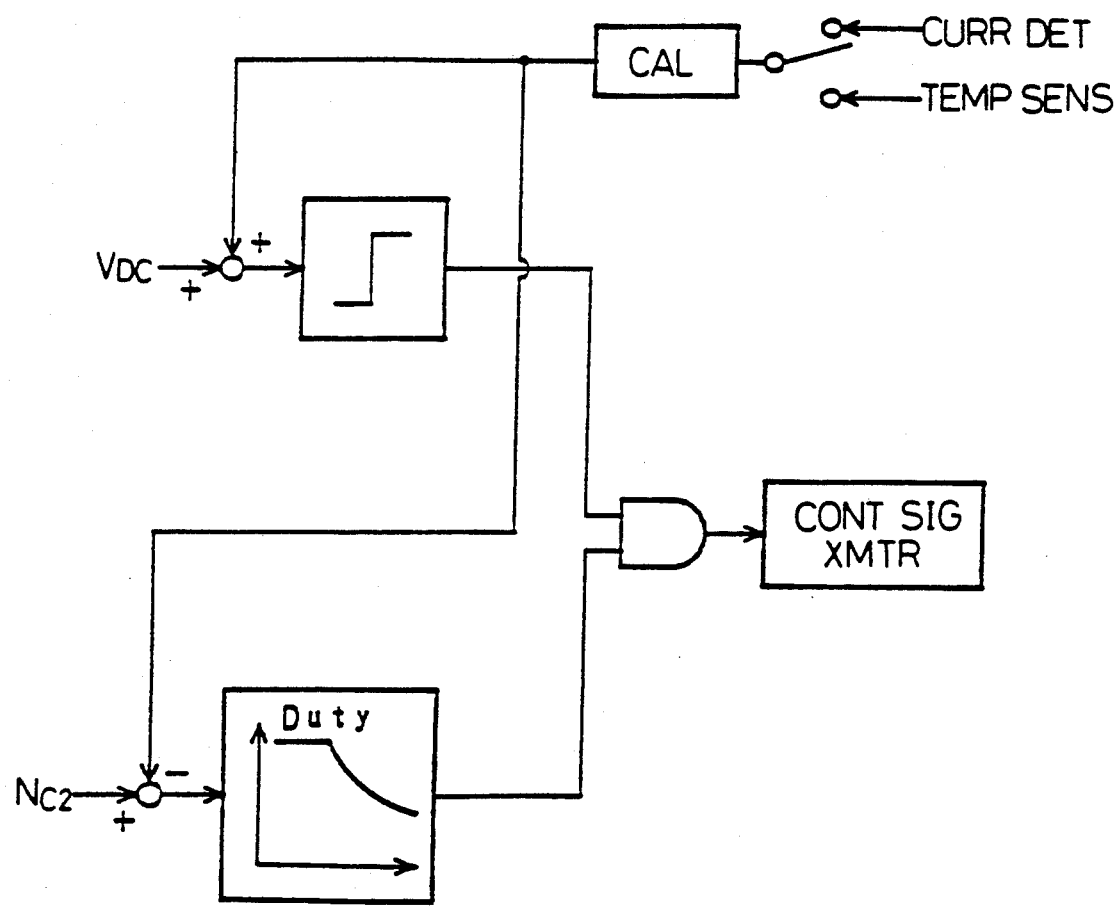
FIG. 14 is a control model chart of a switching controller on the embodiment of this invention.

As is described above, control of the resistance of the resistor 11 involves several factors. It is therefore necessary for the switching controller 14, shown in FIG. 10, to be able to optimally control resistance regarding a number of factors. A control model is illustrated in FIG. 14 for an embodiment of the switching controller 14. The switching controller 14 is in practice realized by a programmed controller as shown in FIG. 14. In the model, DC input voltage Vdc is monitored by a comparator in the main controlling system, and when voltage exceeds the predetermined level (corresponding to the above mentioned Vc), an ON-OFF control signal is issued to make DC voltage Vdc agree with Vc. The first auxiliary control system is provided, where input revolving speed is monitored and compared with a stored table, and when the revolving speed reaches the predetermined level (corresponding to the above Nc2), an ON-OFF control signal is issued. The main controlling system is connected with the auxiliary controlling system by and AND circuit.

There exists another factor for controlling temperature rises in the resistor 11. The factor is controlled by issuing control signals with either the input from the temperature sensor (not shown) provided on the resistor 11 or with the detected current of the resistor 11, or, alternatively, by the method of correcting the control output from the above first auxiliary controlling system.

Figure 15:
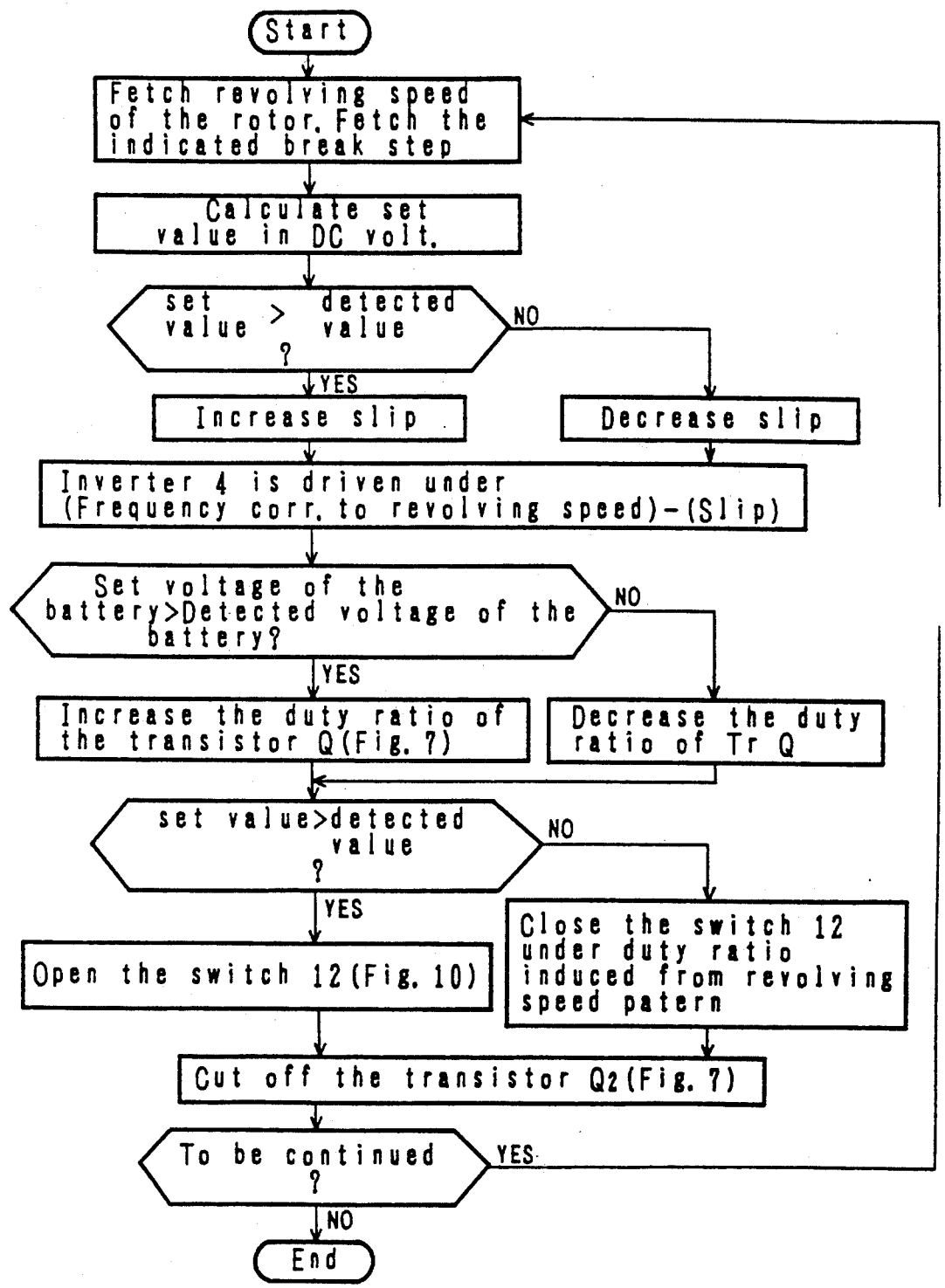
FIG. 15 is a flow chart for the sequence of control in the control mode in the embodiment of this invention.
Figure 16:
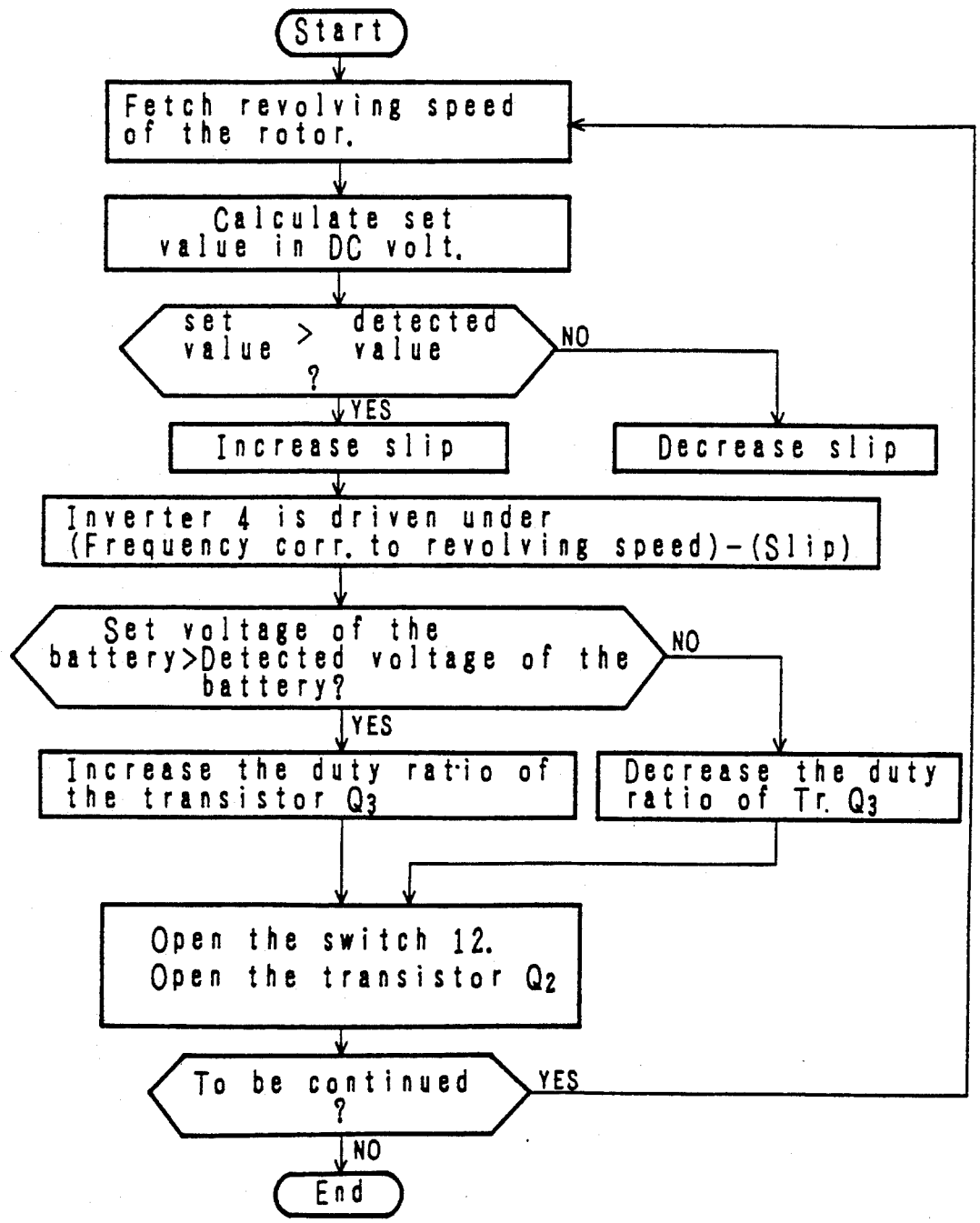
FIG. 16 is a flow chart for the sequence of control in a running mode of the embodiment of this invention.
Figure 17:
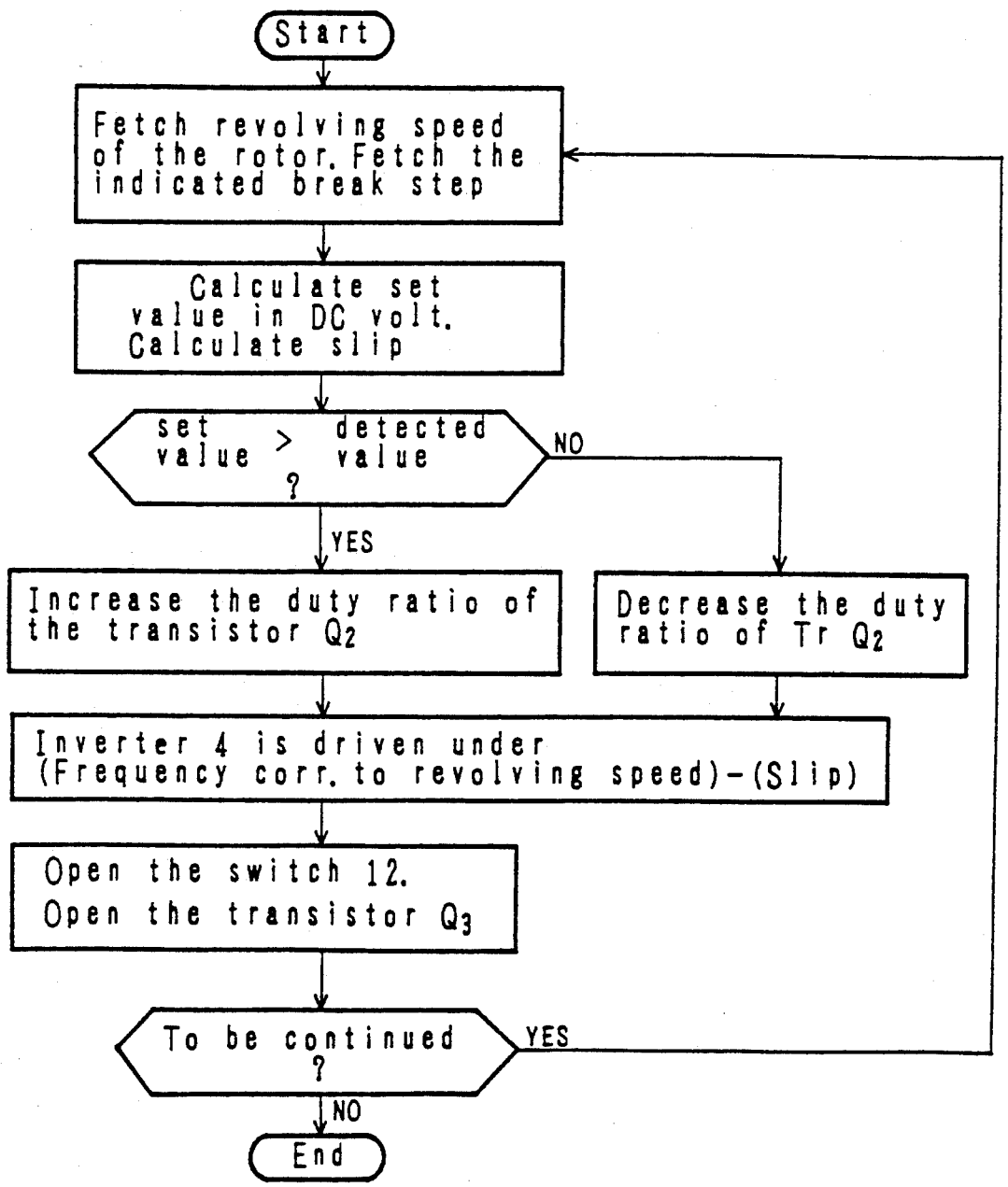
FIG. 17 is a flow chart for the sequence of control in an auxiliary driving mode of the embodiment of this invention.
Figure 18:
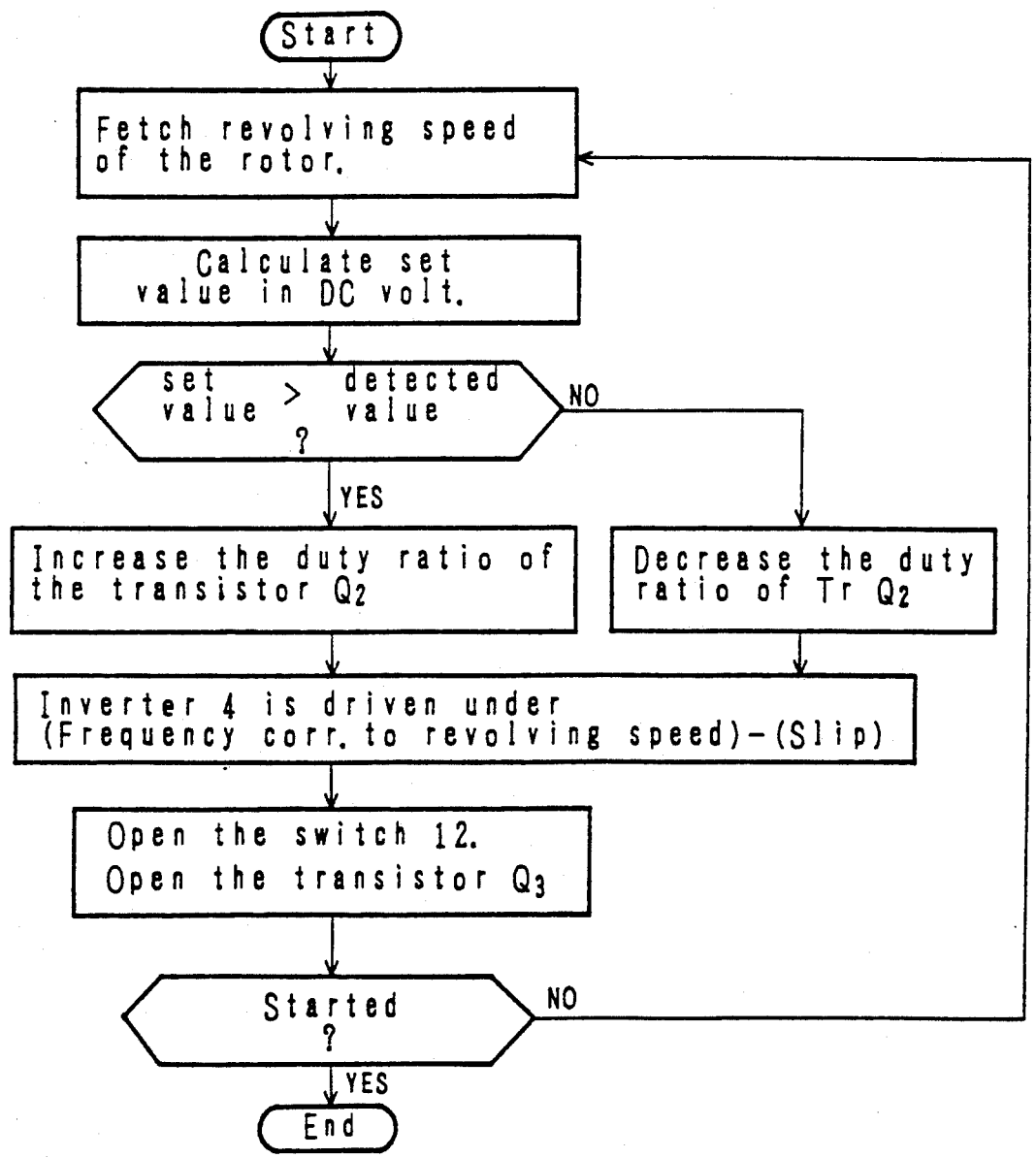
FIG. 18 is a flow chart for the sequence of control in a starting mode of the embodiment of this invention.

In order to carry out these operations, control programs are prepared for the microprocessor CPU of FIG. 5 as shown in FIGS. 15-18 as flow charts. FIG. 15 shows a flow chart in a braking mode, FIG. 16 in a running mode, FIG. 17 in an auxiliary driving mode, and FIG. 18 in a starting mode. In FIGS. 15-18, control by the temperature sensor or by the electric current sensor, which compensates changes in resistance, is omitted.

As shown above, this invention can carry out coordinated control by detecting the revolving speed of the main shaft of the internal combustion engine 1 and the output voltage from the invertor 4, and by changing the duty ratio of ON-OFF control signals to be fed to the semiconductor switching circuit 12 based on the detection output, so that braking torque may be maintained over a wide range. When power is dissipated for a long time and the temperature in the resistor 11 rises, this invention detects the electric current corresponding to temperature change, and changes the duty ratio of the ON-OFF control signals to be fed to the semiconductor switching circuit 12, so that controls over number of factors are harmonized and braking torque may be maintained over a long period of time.

The aforementioned embodiment of the invention has a structure wherein the rotor of the squirrel-cage polyphase induction machine 2 is mounted on the flywheel which is engaged with the crank shaft of the internal combustion engine, and a stator is mounted on the inside of the flywheel housing; however, the mounting position of the induction machine 2 is not limited to the flywheel or to the flywheel housing.

Figure 19:
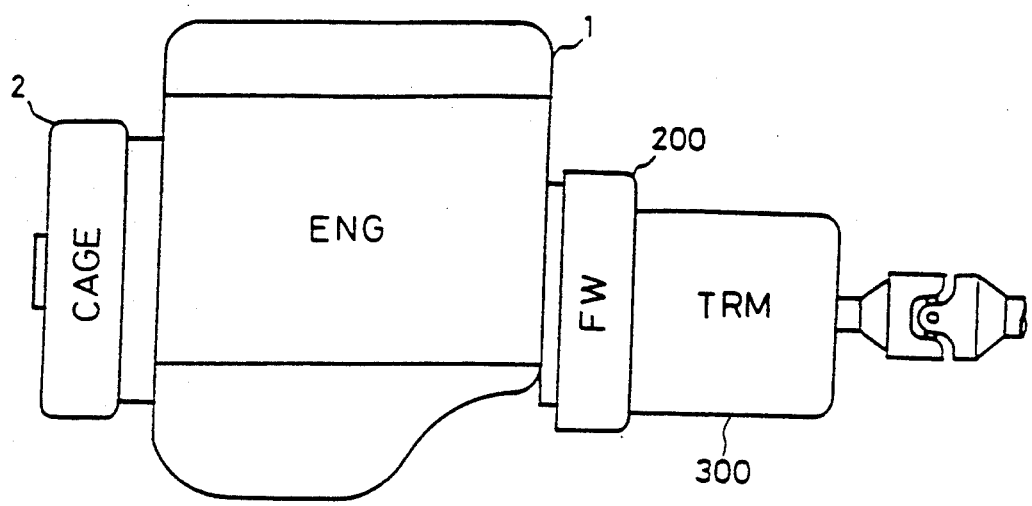
FIG. 19 is a structural view wherein another embodiment of this invention is mounted on the front side of the internal combustion engine.

Some of the embodiments thereof are described below. FIG. 19 shows a structure wherein the squirrel-cage polyphase induction machine 2 is mounted on the front end of an internal combustion engine. Although this structure is inferior, in that it cannot be mounted on a conventional vehicle chassis, it can achieve better balance in the crank shaft, and a crank torsional dumper can be removed.

Figure 20:
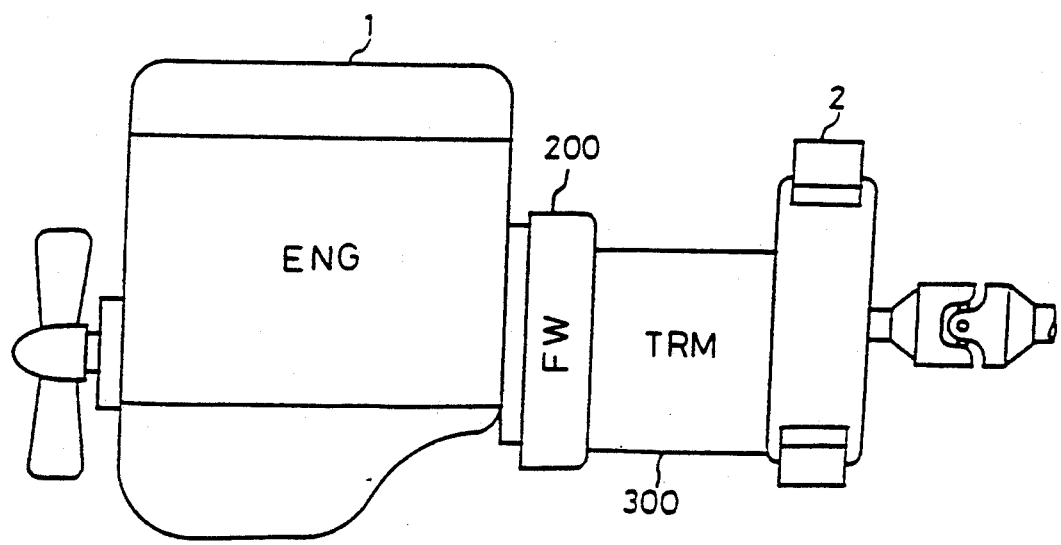
FIG. 20 is a structural view wherein another embodiment of this invention is mounted on the rear side of the transmission.

FIG. 20 shows a structure wherein the squirrel-cage polyphase induction machine 2 is mounted on the rear portion of the transmission 300. In this case, the induction machine 2 is not integral with the internal combustion engine 1 but may be separated by a clutch (not shown) and the transmission 300. This structure allows the application of braking even if separated from the internal combustion engine 1 because the structure is made integral with the rotation of axle.

Figure 21:
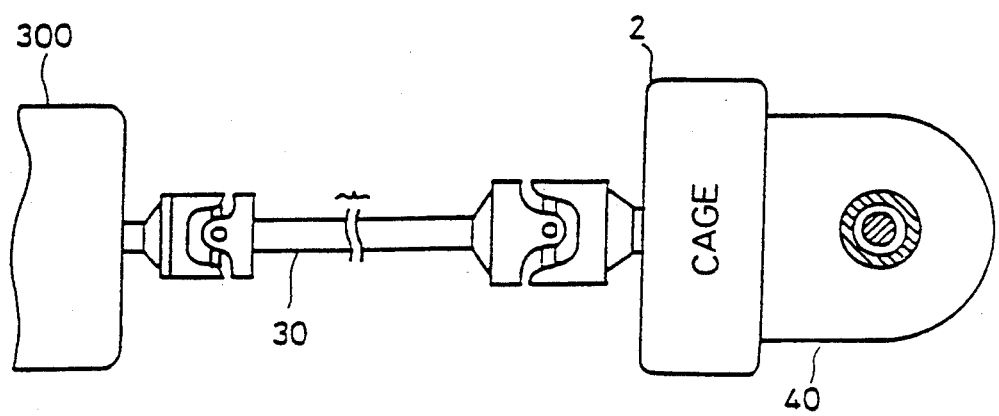
FIG. 21 is a structural view wherein another embodiment of this invention is mounted at the inlet part of the rear axle.

FIG. 21 shows a structure wherein the squirrel-cage polyphase induction machine 2 is mounted on the entrance of the rear axle 40. Like the structure shown in FIG. 20, this structure may be separated by a clutch (not shown) or the transmission 300, and is therefore not integral with the internal combustion engine 1. The attachment structure on the internal combustion engine is identical to the one used for conventional machines, need for without changes or additions, for except in a change in the length of the drive shaft.

Figure 22:
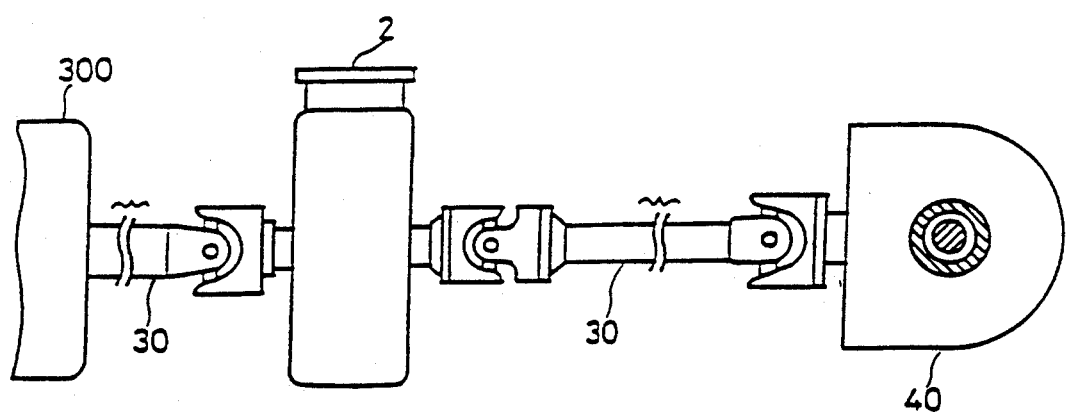
FIG. 22 is a structural view wherein another embodiment of this invention is mounted on the propeller shaft between the transmission and the rear axle.

FIG. 22 shows another structure wherein the squirrel-cage polyphase induction machine 2 is mounted on the propeller shaft 30 between the transmission 300 and the rear axle 40. Like those examples shown in FIGS. 20 and 21, it may be separated by a clutch (not shown) or the transmission 300, and is not integral with the internal combustion engine 1. It has an improved space factor and has the capacity to use a large rotary machine.

As mentioned above, even if the installing position of a squirrel-cage polyphase induction machine 2 on the motor vehicle is different, each embodiment may achieve the similar effect, as stated in the foregoing statement, because structures and operations are the same.

INDUSTRIAL APPLICATIONS

As the mechanism of this invention uses a squirrel-cage polyphase inductor, compared with retarder of an eddy-current type or an inductor-type power generator in prior art, this mechanism is smaller and more durable, less noise and less susceptible to magnetic leakage, to thereby providing a stronger braking force. As the mechanism allows a wider gap between its stator core and rotor core, the manufacturing precision can be less precise. This mechanism is therefore highly suitable for the mass-production of electric braking devices. This mechanism is applicable to various motor vehicles including large, medium and small automobiles.

This mechanism is equipped with an invertor means, which can sufficiently adjust frequencies to output a frequency corresponding to the revolving speed of the rotary magnetic field of the squirrel-cage polyphase inductor, and with a resistor which can dissipate transitional excessive electric energy as thermal energy when the braking force is applied, thereby maintaining a high braking force by dissipating excessive electric energy generated by braking. The mechanism of this invention can be operated as a driving means at a low cost and thereby effectively recycle the energy which is inevitably generated by braking. This saves fuel.

Moreover, this invention can provide a practical application which can generate powerful braking torque effectively over a long period of time and over a wide range of revolving speed.

We claim:

1. An electric braking and auxiliary engine mechanism for a motor vehicle that includes an internal combustion engine that has a flywheel, comprising:
a rotary electric machine coupled to a driving shaft of the internal combustion engine for driving the axle of the vehicle, wherein said rotary machine is a squirrel-cage polyphase induction machine which is mounted spaced from the flywheel, and
means for inducing a revolving magnetic field to the squirrel-cage polyphase induction machine which includes a DC power source including a rechargeable battery, and an inverter which gives a revolving magnetic field to said squirrel-cage polyphase induction machine with the electric current supplied from said DC power source, said inverter having a frequency adjusting range which extends between a first frequency that allows outputs of frequency corresponding to a revolving speed of the revolving magnetic field higher than that of said squirrel-cage polyphase induction machine and a second frequency that allows outputs of a frequency corresponding to the revolving speed of the revolving magnetic field lower than that of said revolving speed of said squirrel-cage polyphase induction machine but in the same direction.

2. The electric braking and auxiliary engine mechanism for a motor vehicle as claimed in claim 1, wherein the invertor means includes switching elements of a complex type which are connected between the phase terminals of the squirrel-cage polyphase induction machine and the positive and negative terminals of the DC power source, and which includes a parallel circuit of transistors and diodes.

3. The electric braking and auxiliary engine mechanism for a motor vehicle as claimed in claim 1, wherein it further includes a rotary sensor which detects the revolving speed information of the squirrel-cage polyphase induction machine as electric signals, a control means which generates a control reference when the vehicle is being driven, an adder which adds the control reference and said revolving speed information and generates an ON-OFF control signal to be given to switching elements, and a DC circuit of a switching circuit connected to both terminals of the DC power source and a resistor of low resistance.

4. The electric braking and auxiliary engine mechanism for a motor vehicle as claimed in claim 3, wherein the control means for setting the control reference includes a first switch which is manipulated by the driver and which instructs auxiliary driving, a second switch which is manipulated by the driver and which instructs auxiliary braking, and a program controller which gives a different positive or negative slip to the squirrel-cage polyphase induction machine by manipulating said first or second switch.

5. The electric braking and auxiliary engine mechanism as claimed in claim 3, wherein the control means, which gives the control reference, includes a circuit which receives as an input the operational data for a starter key switch of the internal combustion engine, while the program circuit includes a means which gives a rotary magnetic field suitable to actuate the internal combustion engine to the squirrel-cage polyphase induction machine based on the operational data to issue the control reference.

6. The electric braking and auxiliary engine mechanism for a motor vehicle as claimed in claim 3, wherein the DC power source includes a rechargeable battery with a rated voltage lower than the control voltage of the DC power source, a step-up chopper and a step-down chopper of a reactor type connected to the rechargeable battery.

7. The electric braking and auxiliary engine mechanism for a motor vehicle as claimed in claim 3, wherein the switching circuit includes a circuit means which automatically closes when the terminal voltage of the DC power source reaches a predetermined voltage exceeding the control voltage thereof.

8. The electric braking and auxiliary engine mechanism for a motor vehicle as claimed in claim 3, wherein the system further comprises a detector which detects electric signals corresponding to the revolving speed of the crank shaft, and a controller which increases the substantial value of the resistor in accordance with the revolving speed indicated by the detection output from said detector.

9. The electric braking and auxiliary engine mechanism for a motor vehicle as claimed in claim 8, wherein the controller further includes a semiconductor switching circuit connected in serial manner to said resistor and a switch controller which gives said semiconductor switching circuit ON-OFF control signals periodically, and said switching controller includes a circuit which changes the duty ratio of the ON-OFF control signals based on said detection outputs.

10. The electric braking and auxiliary engine mechanism as claimed in claim 9, wherein the detector includes a circuit which detects the voltage applied on the resistor as electric signals corresponding to the revolving speed of the crank shaft or the terminal voltage of the serial circuit of the resistor and semiconductor switching circuit.

11. The electric braking and auxiliary engine mechanism for a motor vehicle as claimed in claim 8, wherein the controller controls the effective value of the resistor corresponding to the detection output from the detector.

12. The electric braking and auxiliary engine mechanism for a motor vehicle as claimed in claim 3, wherein the system further includes a detector which detects electric signals corresponding to the temperature of the resistor, and a controller which controls the effective value of said resistor at a low value when said resistor increases.

13. The electric braking and auxiliary engine mechanism for a motor vehicle as claimed in claim 12, wherein the controller includes a semiconductor switching circuit connected to the resistor in serial manner and a switching controller which periodically gives ON-OFF control signals to the semiconductor switching circuit, the switching controller including a circuit which changes the duty ratio of the ON-OFF control signals in accordance with the detection output.

14. The electric braking and auxiliary engine mechanism for a motor vehicle as claimed in claim 13, wherein the detector includes a circuit which detects changes in the electric current passing through the resistor as electric signals corresponding to the temperature of the resistor.

15. The electric braking and auxiliary engine mechanism for a motor vehicle as claimed in claim 12 wherein the switch controller includes a means which controls the substantial value of the resistor only when the effective output from the detector exceeds a predetermined level.

16. The electric braking and auxiliary engine mechanism for a motor vehicle as claimed in claim 3, wherein the system further includes a detector which detects electric signals corresponding to the temperature of the resistor, and a controller which controls the DC current of the inventor in accordance with the detection output of the detector.

17. The electric braking and auxiliary engine mechanism for a motor vehicle as claimed in claim 16, wherein the controller which controls DC voltage includes a means which controls the pulse width of the electric current to be given to the squirrel-cage polyphase induction machine.

18. The electric braking and auxiliary engine mechanism for a motor vehicle as claimed in claim 16, wherein the controller which controls DC current includes a means which controls the revolving speed of the revolving magnetic field to be given to the squirrel-cage polyphase induction machine.

19. The electric braking and auxiliary engine mechanism for a motor vehicle as claimed in claim 1, wherein it further comprises a means which maintains the rechargeable battery at a present target level which is lower than the rated capacity thereof.

20. The electric braking and auxiliary engine mechanism for a motor vehicle as claimed in claim 19, wherein the present target level is of 50 to 70% of the rated capacity thereof.

21. The mechanism as in claim 1 wherein the internal combustion engine has a first end on which said flywheel is mounted, and said squirrel-cage polyphase induction machine is mounted on an opposite end of the internal combustion engine from the first end.

22. A mechanism as in claim 1 wherein said squirrel-cage polyphase induction machine is mounted on an opposite end of a transmission of the vehicle from the end of the transmission on which said flywheel is mounted.

23. A mechanism as in claim 22 further comprising a clutch for selectively separating said polyphase induction machine from the driving shaft of the vehicle.

24. A mechanism as in claim 23 wherein said squirrel-cage polyphase induction machine is mounted on and attached to a rear portion of the transmission, wherein said driving shaft is a shaft within said transmission.

25. A mechanism as in claim 23 wherein said polyphase induction machine is mounted at an entrance of a rear axle.

26. A mechanism as in claim 23 wherein said squirrel-cage polyphase induction machine is mounted on a shaft between the transmission and the rear axle.

27. A mechanism as in claim 22 wherein said squirrel-cage polyphase induction machine is mounted on and attached to a rear portion of the transmission, wherein said driving shaft is a shaft within said transmission.

28. A mechanism as in claim 22 wherein said polyphase induction machine is mounted at an entrance of a rear axle.

29. A mechanism as in claim 22 wherein said squirrel-cage polyphase induction machine is mounted on a shaft between the transmission and the rear axle.

30. An electric braking and auxiliary engine mechanism for a motor vehicle comprising:
a rotary electric machine connected to the crank shaft of the internal combustion engine which drives the axle of the vehicle, wherein said rotary machine is a squirrel-cage polyphase induction machine, which is mounted spaced from the flywheel of the internal combustion engine and said squirrel-cage polyphase induction machine is directly coupled between the transmission and the rear axle of the vehicle; and
means for providing a revolving magnetic field to the squirrel-cage polyphase induction machine, which includes a DC power source including a rechargeable battery, and an inverter which gives a revolving magnetic field to said squirrel-cage polyphase induction machine with the electric current supplied from said DC power source, said inverter having a frequency adjusting range between at least a first frequency that allows outputs of frequency corresponding to a revolving speed of the rotary magnetic field to be higher than a revolving speed of said squirrel-cage polyphase induction machine and a second frequency wherein the revolving speed of the rotary magnetic field is lower than that of said revolving speed of said squirrel-cage polyphase induction machine but in the same direction.

31. A method of operating an electric braking and auxiliary engine mechanism in a motor vehicle, comprising the steps of:

coupling a squirrel-cage polyphase induction machine which is mounted spaced from the flywheel of the internal combustion engine of the motor vehicle to a driving shaft of the vehicle;

inducing a revolving magnetic field in the squirrel-cage polyphase induction machine;

providing a driving signal which sets a revolving speed of said revolving magnetic field;

setting said driving signal to provide said revolving speed of said revolving magnetic field at a speed lower than a mechanical revolving speed of a rotor of the squirrel-cage polyphase induction machine, to brake said engine and use a power of braking to charge a DC power source; and setting said driving signal to provide said revolving speed of said revolving magnetic field at a speed higher than a mechanical revolving speed of the rotor, to provide an auxiliary driving force to the driving shaft of said motor vehicle.

* * * * *